(12) United States Patent
Ganesh et al.

(10) Patent No.: US 12,689,244 B2
(45) Date of Patent: Jul. 21, 2026

(54) OPERATING PHASES IN A WIRELESS POWER TRANSFER (WPT) SYSTEM

(71) Applicant: GE Intellectual Property Licensing, LLC, Niskayuna, NY (US)

(72) Inventors: Jayanti Ganesh, Bangalore (IN); Viswanathan Kanakasabai, Bangalore (IN); Subbarao Tatikonda, Bangalore (IN); Suma Memana Narayana Bhat, Bangalore (IN)

(73) Assignee: GE Intellectual Property Licensing, LLC, Niskayuna, NY (US)

( * ) Notice: Subject to any disclaimer, the term of this patent is extended or adjusted under 35 U.S.C. 154(b) by 0 days.

(21) Appl. No.: 18/862,380

(22) PCT Filed: May 2, 2023

(86) PCT No.: PCT/US2023/066480
§ 371 (c)(1),
(2) Date: Nov. 1, 2024

(87) PCT Pub. No.: WO2023/215732
PCT Pub. Date: Nov. 9, 2023

(65) Prior Publication Data
US 2025/0293553 A1 Sep. 18, 2025

(30) Foreign Application Priority Data

May 3, 2022 (IN) ............................. 202211025803

(51) Int. Cl.
| | |
|---|---|
| *H02J 50/80* | (2016.01) |
| *H02J 50/00* | (2016.01) |
| *H02J 50/12* | (2016.01) |
| *H02J 50/60* | (2016.01) |

(52) U.S. Cl.
CPC ............ *H02J 50/80* (2016.02); *H02J 50/001* (2020.01); *H02J 50/005* (2020.01); *H02J 50/12* (2016.02); *H02J 50/60* (2016.02)

(58) Field of Classification Search
CPC ........ H02J 50/001; H02J 50/005; H02J 50/12; H02J 50/60; H02J 50/80
See application file for complete search history.

(56) References Cited

U.S. PATENT DOCUMENTS

| | | | |
|---|---|---|---|
| 9,859,745 | B2 | 1/2018 | Byun et al. |
| 10,141,770 | B2 | 11/2018 | Partovi |

(Continued)

FOREIGN PATENT DOCUMENTS

| | | |
|---|---|---|
| EP | 3965262 | 3/2022 |
| WO | 2021024362 | 2/2021 |
| WO | 2023215732 | 11/2023 |

OTHER PUBLICATIONS

"Ki Cordless Kitchen Wireless Power Specification", Wireless Power Consortium, Review Draft 1.0, Apr. 2022, Apr. 2022, 50 pages.

(Continued)

*Primary Examiner* — Rexford N Barnie
*Assistant Examiner* — Joseph N Inge
(74) *Attorney, Agent, or Firm* — DeLizio, Peacock, Lewin & Guerra LLP

(57) ABSTRACT

This disclosure provides systems, methods and apparatuses for managing phase transitions of a wireless power transfer (WPT) system. For example, transitions between a connected phase and a power transfer phase may be coordinated in relation to changing a protective switch (one or more switches) in a power receiver. The protective switch may decouple or couple a secondary coil of the power receiver with a power reception circuit (such as a load or a rectifier). A first position of the protective switch may open a circuit (Continued)

that includes the secondary coil and the power reception circuit. A second position of the protective switch may close the circuit such that the secondary coil can receive the wireless power and provide the wireless power to the load during the power transfer phase. This disclosure also describes how a WPT system may temporarily pause wireless power transfer while remaining in a power transfer phase.

16 Claims, 16 Drawing Sheets

(56)                    References Cited

U.S. PATENT DOCUMENTS

| | | | |
|---|---|---|---|
| 10,491,271 B2* | 11/2019 | Pifferi | .................... H04B 5/26 |
| 2015/0180268 A1 | 6/2015 | Byun et al. | |

| | | | |
|---|---|---|---|
| 2016/0056664 A1 | 2/2016 | Partovi | |
| 2016/0121748 A1* | 5/2016 | Wytock | .................... G06F 1/26 |
| | | | 320/109 |
| 2016/0311337 A1* | 10/2016 | Ichikawa | ................ B60L 50/50 |
| 2018/0013309 A1* | 1/2018 | Winkler | ................... H02J 7/42 |
| 2019/0044321 A1* | 2/2019 | Misawa | ............... H02H 7/1255 |
| 2022/0278554 A1 | 9/2022 | Mishima et al. | |
| 2022/0294272 A1 | 9/2022 | Lee et al. | |

OTHER PUBLICATIONS

"PCT Application No. PCT/US23/66480 International Search Report and Written Opinion", Oct. 17, 2023, 18 pages.

Shu, et al., "Wireless Power Supply for Small Household Appliances Using Energy Model", IEEE, vol. 6, Nov. 13, 2018, 11 pages.

Zhao, et al., "A Flexible Wireless Power Transfer System With Switch Controlled Capacitor", IEEE, vol. 7, Jul. 18, 2019, 9 pages.

* cited by examiner

EXAMPLE WIRELESS POWER TRANSFER (WPT) SYSTEMS

EXAMPLE OPERATING PHASES

700

| DETERMINE THAT A POWER TRANSMITTER (PTX) IS IN A CONNECTED PHASE OF OPERATION WITH THE PRX | 710 |

| CAUSE, DURING THE CONNECTED PHASE, A PROTECTIVE SWITCH OF THE PRX TO CHANGE FROM A FIRST POSITION TO A SECOND POSITION, THE PROTECTIVE SWITCH DISPOSED BETWEEN A SECONDARY COIL OF THE PRX AND A LOAD ASSOCIATED WITH THE PRX, WHEREIN THE FIRST POSITION IS CONFIGURED TO NORMALLY OPEN A CIRCUIT THAT INCLUDES THE SECONDARY COIL BEFORE A POWER TRANSFER PHASE OF OPERATION, WHEREIN THE SECOND POSITION IS CONFIGURED TO CLOSE THE CIRCUIT | 720 |

| COMMUNICATE A POWER REQUEST TO THE PTX AFTER THE PROTECTIVE SWITCH IS CHANGED TO THE SECOND POSITION | 730 |

| TRANSITION FROM THE CONNECTED PHASE TO THE POWER TRANSFER PHASE | 740 |

| RECEIVE WIRELESS POWER FROM THE PTX DURING AT LEAST PART OF THE POWER TRANSFER PHASE. | 750 |

*FIGURE 7*

800

DETERMINE THAT A POWER RECEIVER (PRX) IS IN A CONNECTED PHASE OF OPERATION WITH THE PTX BASED, AT LEAST IN PART, ON A COMMUNICATION WITH THE PRX  ⎯ 810

RECEIVE A POWER REQUEST FROM THE PRX, THE POWER REQUEST ASSOCIATED WITH REQUESTING A TRANSFER OF WIRELESS POWER FROM THE PTX TO THE PRX, WHEREIN THE POWER REQUEST REPRESENTS AN INDICATION THAT THE PRX HAS CHANGED A PROTECTIVE SWITCH TO CLOSE A CIRCUIT THAT INCLUDES A SECONDARY COIL OF THE PRX  ⎯ 820

CAUSE AN INVERTER TO GENERATE A WIRELESS POWER SIGNAL FOR THE TRANSFER OF THE WIRELESS POWER IN RESPONSE TO THE POWER REQUEST  ⎯ 830

TRANSITION FROM THE CONNECTED PHASE TO A POWER TRANSFER PHASE OF OPERATION  ⎯ 840

TRANSMIT THE WIRELESS POWER SIGNAL TO TRANSFER OF THE WIRELESS POWER TO THE SECONDARY COIL OF THE PRX.  ⎯ 850

*FIGURE 8*

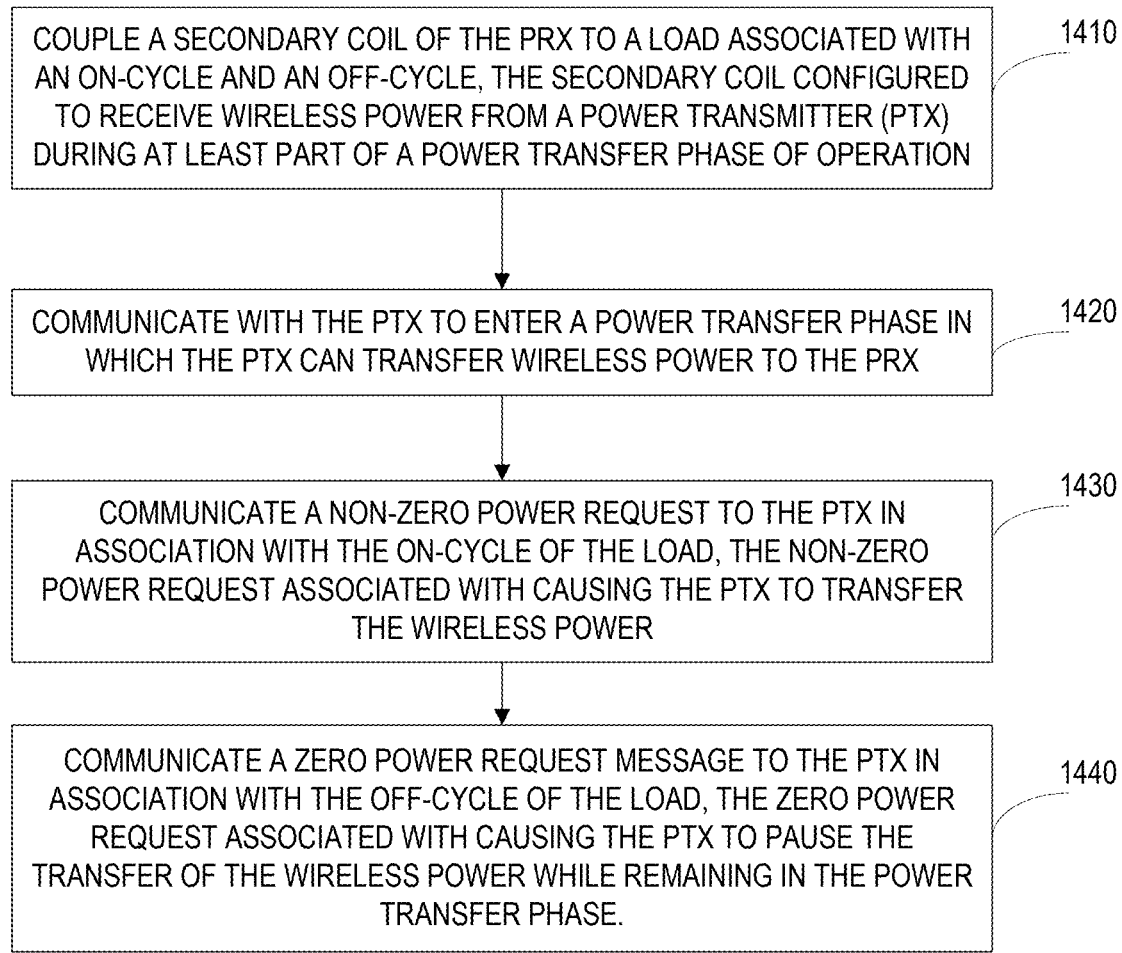

1400

COUPLE A SECONDARY COIL OF THE PRX TO A LOAD ASSOCIATED WITH AN ON-CYCLE AND AN OFF-CYCLE, THE SECONDARY COIL CONFIGURED TO RECEIVE WIRELESS POWER FROM A POWER TRANSMITTER (PTX) DURING AT LEAST PART OF A POWER TRANSFER PHASE OF OPERATION — 1410

COMMUNICATE WITH THE PTX TO ENTER A POWER TRANSFER PHASE IN WHICH THE PTX CAN TRANSFER WIRELESS POWER TO THE PRX — 1420

COMMUNICATE A NON-ZERO POWER REQUEST TO THE PTX IN ASSOCIATION WITH THE ON-CYCLE OF THE LOAD, THE NON-ZERO POWER REQUEST ASSOCIATED WITH CAUSING THE PTX TO TRANSFER THE WIRELESS POWER — 1430

COMMUNICATE A ZERO POWER REQUEST MESSAGE TO THE PTX IN ASSOCIATION WITH THE OFF-CYCLE OF THE LOAD, THE ZERO POWER REQUEST ASSOCIATED WITH CAUSING THE PTX TO PAUSE THE TRANSFER OF THE WIRELESS POWER WHILE REMAINING IN THE POWER TRANSFER PHASE. — 1440

FIGURE 14

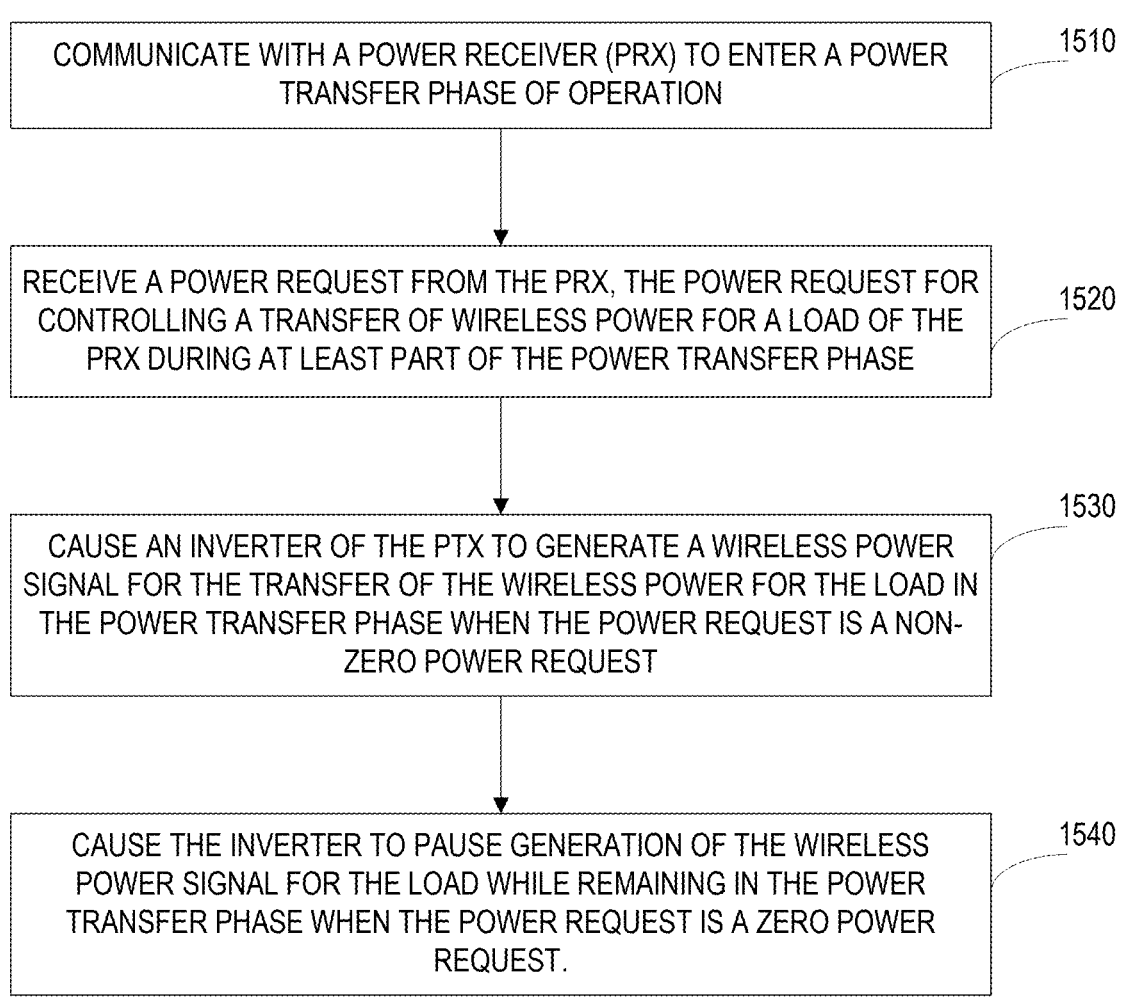

 1500

COMMUNICATE WITH A POWER RECEIVER (PRX) TO ENTER A POWER TRANSFER PHASE OF OPERATION — 1510

RECEIVE A POWER REQUEST FROM THE PRX, THE POWER REQUEST FOR CONTROLLING A TRANSFER OF WIRELESS POWER FOR A LOAD OF THE PRX DURING AT LEAST PART OF THE POWER TRANSFER PHASE — 1520

CAUSE AN INVERTER OF THE PTX TO GENERATE A WIRELESS POWER SIGNAL FOR THE TRANSFER OF THE WIRELESS POWER FOR THE LOAD IN THE POWER TRANSFER PHASE WHEN THE POWER REQUEST IS A NON-ZERO POWER REQUEST — 1530

CAUSE THE INVERTER TO PAUSE GENERATION OF THE WIRELESS POWER SIGNAL FOR THE LOAD WHILE REMAINING IN THE POWER TRANSFER PHASE WHEN THE POWER REQUEST IS A ZERO POWER REQUEST. — 1540

*FIGURE 15*

OPERATING PHASES IN A WIRELESS POWER TRANSFER (WPT) SYSTEM

CROSS-REFERENCE TO RELATED APPLICATIONS

This Patent Application is a National Stage of International Application No. PCT/US23/66480, filed May 2, 2023, and claims the benefit of priority to India Non-Provisional patent application No. 202211025803, filed May 3, 2022, assigned to the assignee hereof, the disclosures of which are incorporated by reference in this Patent Application.

TECHNICAL FIELD

This disclosure relates generally to wireless power and specifically, in some implementations, to operating phases in a wireless power transfer system.

DESCRIPTION OF RELATED TECHNOLOGY

Technology has been developed to enable the wireless transmission of power from a power transmitter to a power receiver. Examples of a power receiver may include some types of mobile devices, small electronic devices, computers, tablets, gadgets, appliances (such as cordless blenders, kettles, or mixers), and some types of larger electronic devices, among other examples. Wireless power transmission may be referred to as a contactless power transmission or a non-contact power transmission. The wireless power may be transferred using inductive coupling or resonant coupling between a primary coil of the power transmitter and a secondary coil of the power receiver. For example, a power transmitter may include a primary coil that produces a magnetic field. The magnetic field may induce an electromotive force in a secondary coil of a power receiver when the secondary coil is placed in proximity to the primary coil. In this configuration, the magnetic field may wirelessly transfer power to the secondary coil.

A wireless power transfer system may operate in different operating phases, such as an idle phase, a configuration phase, a connected phase, and a power transfer phase. As different types of power receivers and power transmitters are developed, they may implement features that extend beyond traditional wireless power transfer. There is a need for a power receiver and a power transmitter to coordinate the transitions among the various operating based on newly developed features.

SUMMARY

The systems, methods, and apparatuses of this disclosure each have several innovative aspects, no single one of which is solely responsible for the desirable attributes disclosed herein.

One innovative aspect of the subject matter described in this disclosure can be implemented as a power receiver (PRx) of a wireless power transfer (WPT) system. The PRx may include a secondary coil configured to receive wireless power from a power transmitter (PTx) during at least part of a power transfer phase of operation. The PRx may include a protective switch disposed between the secondary coil and a load associated with the PRx, where the protective switch is normally in a first position configured to open a circuit that includes the secondary coil before the power transfer phase. The PRx may include a wireless communication unit and the PRx controller. The PRx controller may be configured to determine that the PTx is in a connected phase of operation with the PRx. The PRx controller may be configured to generate, during the connected phase, a switch signal configured to cause the protective switch to change to a second position, where the second position is configured to close the circuit that includes the secondary coil. The PRx controller may be configured to cause the wireless communication unit to communicate a power request for the PTx to transmit the wireless power after the protective switch is changed to the second position. The PRx controller may be configured to transition from the connected phase to the power transfer phase.

Another innovative aspect of the subject matter described in this disclosure can be implemented as a PTx of a WPT system. The PTx may be include an inverter configured to generate a wireless power signal. The PTx may be include a primary coil operatively coupled to the inverter and configured to transmit the wireless power signal in association with a transfer of wireless power to a secondary coil of a PRx. The PTx may be include a wireless communication interface configured to communicate with a wireless communication unit of the PRx. The PTx may be include a PTx controller. The PTx controller may be configured to determine that the PRx is in a connected phase of operation with the PTx, receive, via the wireless communication interface, a power request for the PTx to transmit the wireless power. The power request may represent an indication that the PRx has changed a protective switch to close a circuit that includes the secondary coil and a load of the PRx. The PTx controller may be configured to cause the inverter to generate the wireless power signal for the transfer of the wireless power in response to the power request. The PTx controller may be configured to transition from the connected phase to a power transfer phase of operation.

Another innovative aspect of the subject matter described in this disclosure can be implemented as a PRx of a WPT system. The PRx may include a secondary coil operatively coupled to a load associated with an on-cycle and an off-cycle, the secondary coil configured to receive wireless power from a PTx during at least part of a power transfer phase of operation. The PRx may include a wireless communication unit and a PRx controller. The PRx controller may be configured to cause the wireless communication unit to communicate with the PTx to enter the power transfer phase in which the PTx can transfer the wireless power. The PRx controller may be configured to cause the wireless communication unit to communicate a non-zero power request associated with causing the PTx to transfer the wireless power in association with the on-cycle of the load. The PRx controller may be configured to cause the wireless communication unit to communicate a zero power request message associated with causing the PTx to pause the transfer of the wireless power in association with the off-cycle of the load while remaining in the power transfer phase.

Another innovative aspect of the subject matter described in this disclosure can be implemented as a PTx of a WPT system. The PTx may include an inverter configured to generate a wireless power signal. The PTx may include a primary coil operatively coupled to the inverter and configured to transmit the wireless power signal in association with a transfer of wireless power to a PRx during at least part of a power transfer phase of operation. The PTx may include a wireless communication interface configured to receive a power request from the PRx. The PTx may include a PTx controller. The PTx controller may be configured to cause the wireless communication interface to communicate with the PRx to enter the power transfer phase. The PTx controller may be configured to cause the inverter to generate the wireless power signal for the transfer of the wireless power for a load of the PRx in the power transfer phase when the power request is a non-zero power request. The PTx controller may be configured to cause the inverter to pause generation of the wireless power signal for the transfer of the wireless power for the load in the power transfer phase when the power request is a zero power request.

Another innovative aspect of the subject matter described in this disclosure can be implemented as a method of a PRx in a WPT system. The method may include determining that a PTx is in a connected phase of operation with the PRx. The method may include causing, during the connected phase, a protective switch of the PRx to change from a first position to a second position, the protective switch disposed between a secondary coil of the PRx and a load associated with the PRx, where the first position is configured to normally open a circuit that includes the secondary coil before a power transfer phase of operation, where the second position is configured to close the circuit. The method may include communicating a power request to the PTx after the protective switch is changed to the second position. The method may include transitioning from the connected phase to the power transfer phase and receiving wireless power from the PTx during at least part of the power transfer phase.

Another innovative aspect of the subject matter described in this disclosure can be implemented as a method of a PRx in a WPT system. The method may include coupling a secondary coil of the PRx to a load associated with an on-cycle and an off-cycle, the secondary coil configured to receive wireless power from a power transmitter (PTx) during at least part of a power transfer phase of operation. The method may include communicating with the PTx to enter a power transfer phase in which the PTx can transfer wireless power to the PRx. The method may include communicating a non-zero power request to the PTX in association with the on-cycle of the load, the non-zero power request associated with causing the PTx to transfer the wireless power. The method may include communicating a zero power request message to the PTX in association with the off-cycle of the load, the zero power request associated with causing the PTx to pause the transfer of the wireless power while remaining in the power transfer phase.

Another innovative aspect of the subject matter described in this disclosure can be implemented as a method of a PTx in a WPT system. The method may include determining that a PRx is in a connected phase of operation with the PTx based, at least in part, on a communication with the PRx. The method may include receiving a power request from the PRx, the power request associated with requesting a transfer of wireless power from the PTx to the PRx, where the power request represents an indication that the PRx has changed a protective switch to close a circuit that includes a secondary coil and a load of the PRx. The method may include causing an inverter to generate a wireless power signal for the transfer of the wireless power in response to the power request. The method may include transitioning from the connected phase to a power transfer phase of operation and transmitting the wireless power signal to transfer of the wireless power to the secondary coil of the PRx.

Another innovative aspect of the subject matter described in this disclosure can be implemented as a method of a PTx in a WPT system. The method may include communicating with a PRx to enter a power transfer phase of operation. The method may include receiving a power request from the PRx, the power request for controlling a transfer of wireless power for a load of the PRx during at least part of the power transfer phase. The method may include causing an inverter of the PTx to generate a wireless power signal for the transfer of the wireless power for the load in the power transfer phase when the power request is a non-zero power request. The method may include causing the inverter to pause generation of the wireless power signal for the load while remaining in the power transfer phase when the power request is a zero power request.

Details of one or more implementations of the subject matter described in this disclosure are set forth in the accompanying drawings and the description below. Other features, aspects, and advantages will become apparent from the description, the drawings, and the claims.

BRIEF DESCRIPTION OF THE DRAWINGS

FIG. 7 shows a flowchart diagram of an example process of a power receiver in accordance with some implementations.

FIG. 8 shows a flowchart diagram of an example process of a power transmitter in accordance with some implementations.

FIG. 14 shows a flowchart diagram of an example process of a power receiver to control wireless power delivery during a power transfer phase in accordance with some implementations.

FIG. 15 shows a flowchart diagram of an example process of a power transmitter to control wireless power delivery during a power transfer phase in accordance with some implementations.

Note that the relative dimensions of the following figures may not be drawn to scale. Like reference numbers and designations in the various drawings indicate like elements.

DETAILED DESCRIPTION

Figure 1:
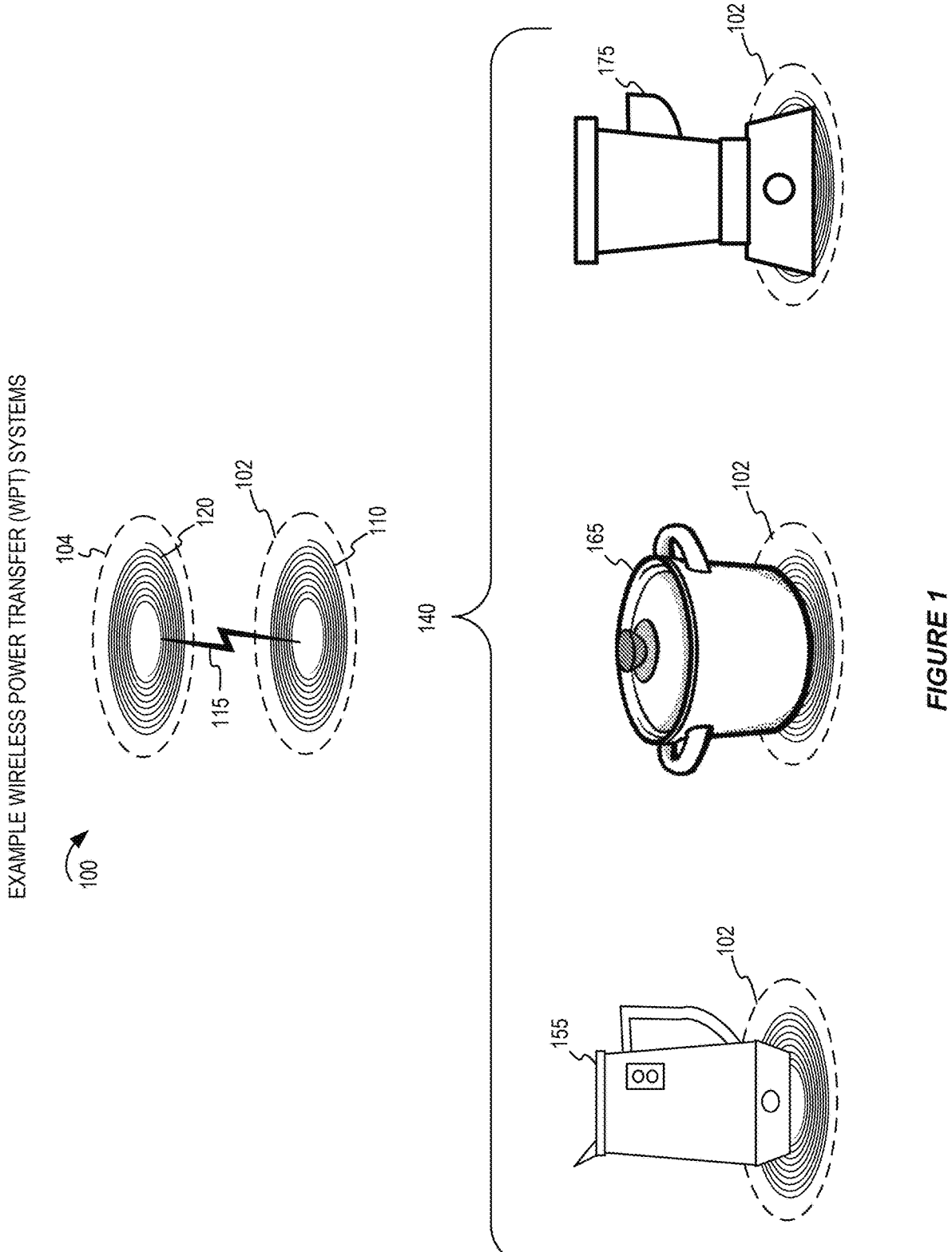
FIG. 1 shows a pictorial diagram of example wireless power transfer systems.

A wireless power transfer (WPT) system may include a power transmitter (sometimes referred to as "wireless power transmission apparatus," "Power Transmitter" or "PTx") and a power receiver (sometimes referred to as "wireless power reception apparatus," "Power Receiver" or "PRx"). The power transmitter may include one or more primary coils that transfer wireless energy (as a wireless power signal) to one or more corresponding secondary coils in the power receiver. A primary coil refers to a source of wireless energy (such as inductive or magnetic resonant energy producing a magnetic field) in the power transmitter. A secondary coil located in the power receiver may receive the wireless energy via the magnetic field. Wireless power transfer refers to the transmission and reception of the wireless energy. The wireless energy may be used to power a load or other components associated with the power receiver; thus, the wireless energy may be referred to as wireless power.

A WPT system operates in different phases, such as an idle phase, a configuration phase, a connected phase, and a power transfer phase. For example, the power transmitter typically begins in the idle phase after being turned on. Turning on the power transmitter refers to powering a controller, communication unit, driver, or other components of the power transmitter except for the primary coil. The primary coil is only energized in the power transfer phase after a communication to do so between a power receiver and the power transmitter. As new features have been introduced to power transmitter designs, the transitions between some phases may be unclear. For example, new features may include a protective switch in a circuit that includes the secondary coil. A first position of the protective switch may prevent the secondary coil from inducing a voltage from the magnetic field. A second position of the protective switch may enable the secondary coil to receive the induced voltage from the magnetic field. This disclosure includes descriptions of several types of protective switches. There exists a need to manage transitions between some operating phases in coordination with the position of the protective switch. Similarly, transitions between operating phases may depend on other new features, such as foreign object detection sequences, an activation switch controlled by a user, a load switch associated with the load, availability of a wired power source, or certain types of loads, among other examples.

This disclosure provides systems, methods and apparatuses for managing phase transitions of a WPT system. In some implementations, a transition between a connected phase and a power transfer phase (or vice versa) may be coordinated in relation to changing a protective switch in a power receiver. This disclosure describes how communication may be structured to coordinate a phase transition in relation to a protective switch. The examples of this disclosure are usable with various types of control architectures-including those in which a power receiver implements a variable load and a load controller communicates power commands to directly control the wireless power transfer, as well as those in which the power receiver has a simple load like a heater load with a single power setting and that relies on a control loop of the power transmitter. This disclosure also describes how a WPT system may temporarily pause wireless power transfer while remaining in a power transfer phase. Such techniques may be useful for appliances that include a load having an on-cycle and an off-cycle. In some implementations, the power receiver may control wireless power transfer for the load without a need to transition out of the power transfer phase. For example, a "zero power message" or a "non-zero power message" may be used to disable or enable, respectively, the wireless power transfer during the power transfer phase.

In some implementations, a power receiver may include an energy harvester configured to harvest a bias power from out-of-band wireless communication signals. This disclosure describes how wireless communication signals may be transmitted by a power transmitter during various operating phases such that the power receiver can harvest the bias power. The bias power may be used to operate one or more components of the power receiver, such as a wireless communication unit, a controller, or a protective switch, among other examples. Because the bias power may be necessary to operate the power receiver during times when a wireless power transfer is disabled, this disclosure describes several examples in which wireless communication signals (for bias power) may be coordinated in the various operating phases or status of wireless power transfer.

Particular implementations of the subject matter described in this disclosure can be implemented to realize one or more of the following potential advantages. A power receiver may coordinate the protective features of a protective switch with the timing for wireless power transfer. A power transmitter can rely on the communications or protocols described herein to reliably enable wireless power transfer at the appropriate time (such as when the protective switch is in a second position). Using the phase transition techniques in this disclosure, a power receiver can implement a protective switch to protect components of the power transmitter while also supporting the use of wireless power transfer when the wireless power is needed for a load.

The following description is directed to certain implementations for the purposes of describing innovative aspects of this disclosure. However, a person having ordinary skill in the art will readily recognize that the teachings herein can be applied in a multitude of different ways. The described implementations can be implemented in any means, apparatus, system, or method for wireless power transfer.

FIG. 1 shows a pictorial diagram of example wireless power transfer systems 100. The wireless power transfer system may include a power transmitter 102 and a power receiver 104. The power transmitter 102 includes a primary coil 110. The primary coil 110 may be associated with a power signal generator (not shown). For example, the power signal generator may include an inductor or other components the generate a wireless power signal applied to the primary coil 110. The primary coil 110 may be a wire coil which transmits the wireless power signal as wireless power (which also may be referred to as wireless energy). The primary coil 110 may transmit wireless energy using inductive or magnetic resonant field. Using the wireless power signal, the primary coil 110 may generate a primary magnetic field during wireless power transfer. The power transmitter 102 also may include a power transmitter controller (PTx controller, not shown) that controls the components of the power transmitter 102, including those that generate the wireless power signal. For example, the PTx controller may determine an operating point (such as voltage or current) and control a power signal generator to generate the wireless power signal according to the operating point. When the primary coil 110 transmits the wireless power 115, it creates a magnetic field that induces a voltage in a secondary coil 120 of the power receiver 104.

The power receiver 104 may include a secondary coil 120 configured to receive the wireless power 115. When the secondary coil 120 is aligned to the primary coil 110, the secondary coil 120 may generate an induced voltage based on a received wireless power 115 from the primary coil 110. In some implementations, a capacitor (not shown) may be in series between the secondary coil 120 and a power reception circuit (not shown). In some implementations, the power reception circuit may include a rectifier (if present) or other components to condition the wireless power and provide the wireless power for use by a load (not shown). In some implementations, the power reception circuit may exclude the rectifier and provide the wireless power directly to the load. In some implementations, the load may be integrated in an appliance that includes the power receiver 104. In some implementations, the power receiver 104 may provide the wireless power to an external load associated with the power receiver 104. The power receiver 104 may include a power receiver controller (PRx controller, not shown) configured to control wireless power transfer operating states with a corresponding PTx controller of the power transmitter 102. The power receiver 104 also may include a wireless communication unit, an energy harvester, among other examples, as described further herein As described herein, the wireless power signal 115 may be used to wirelessly transfer power using electromotive force in the secondary coil 120. The electromotive force may create an electrical voltage and current in the secondary coil 120 when the secondary coil 120 is connected to other components (such as a power reception circuit or a load) associated with the power receiver 118. However, there may be times during which the power receiver 118 may not be ready to use the power or when the power could otherwise damage the other components of the power receiver 118. To prevent damage to the other components or to disable the transfer of unintended wireless power, the power receiver 104 may include one or more switches (not shown) configured to open a circuit that includes the secondary coil 120. Opening the circuit also may be referred to as disconnecting or decoupling the secondary coil 120 from the power reception circuit. Thus, even if a magnetic field is induced near the secondary coil 120, the secondary coil 120 will not conduct a current due to the secondary coil 120 being disconnected from the power reception circuit or load. The one or more switches may prevent an induced voltage from flowing through the secondary coil 120 to the power reception circuit. This disclosure includes several options for placement, structure, and operation of the switch.

The power receiver 104 may be associated with an appliance (such as a cordless kitchen appliance, among other examples) may be intended to operate on a wireless power transmitting surface configured with one or more primary coils (such as a kitchen countertop, stovetop, or hob). FIG. 1 shows some examples 140 of appliances that may be used with a power transmitter 102. For example, the appliance may be a kettle 155, a pot 165, or a blender 175. Other types of appliances that may include a power receiver may include a slow cooker, a rice cooker, a coffee machine, a toaster, a broiler, a griddle, an electric pan, any type of appliance configured to heat a liquid or food, among other examples.

The power transmitter 102 may be included in a kitchen appliance such as a cooktop or hob. For example, in some implementations, a hob may include several locations for placement of objects. At least one of the locations may include a power transmitter 102 that supports wireless power transfer to an appliance that includes a power receiver 104. In some implementation, a power transmitter 102 may be integrated in a hob that is portable in nature. For example, a portable hob may include a battery or be capable of an external power source to power the power transmitter 102, and may be suitable for camping.

The power transmitter 102 and the power receiver 104 may implement a control architecture for managing the transfer of wireless power. The control architecture may define how power requirements are communicated and how an operating point of the power transmitter is controlled. In some implementations, the control architecture may be based on static power control (referred to as "control type 1 architecture" or "type 1"). In some implementations, the control architecture may be based on dynamic power control (referred to as "control type 0 architecture" or "type 0"). An appliance that implements the control type 1 architecture may have a fixed load, might not include measurement circuits, typically may not employ auxiliary data transfer, and may require only minimal functionality so as to contain manufacturing costs. The control type 1 architecture may use rely on a control loop of the power transmitter 102 without feedback from the power receiver 104. An appliance that implements the control type 0 architecture may have a static or dynamic load and may implement a controller to generate a power request message during power transfer as well as measurement circuits for proper control of its load. This disclosure includes examples of both type 0 and type 1 control architectures as they relate to transitions between various operating phases.

Figure 2:
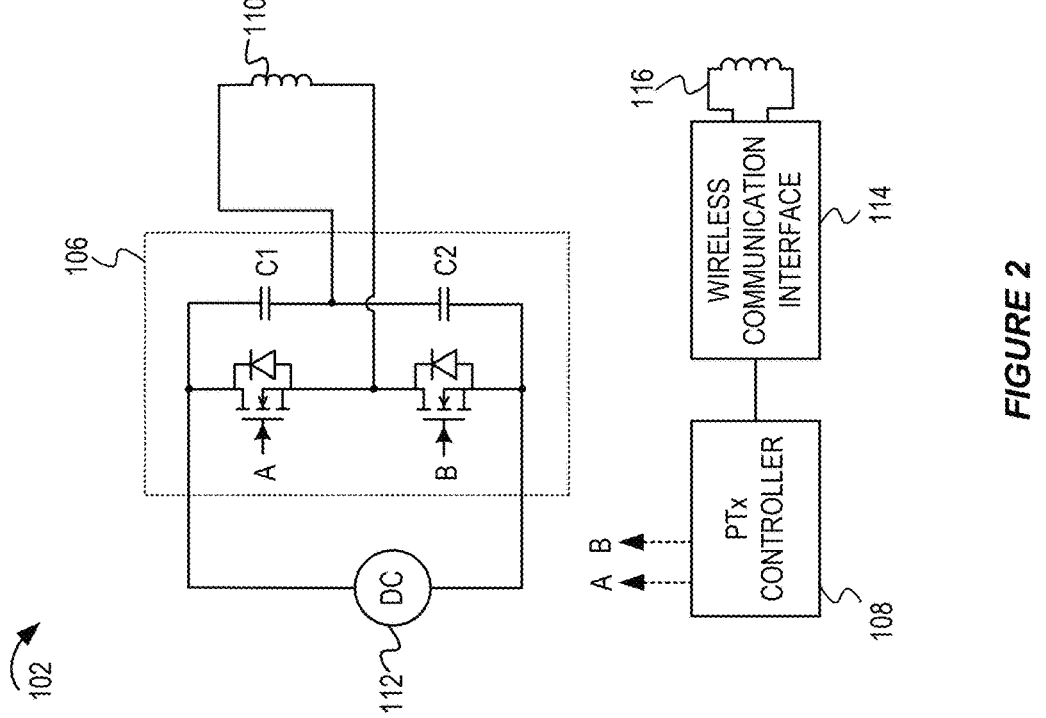
FIG. 2 shows a block diagram of an example power transmitter.

FIG. 2 shows a block diagram of an example power transmitter 102. The power transmitter 102 may include a power source 112, a power signal generator 106, and a primary coil 110. The power signal generator 106 is illustrated with a half-bridge circuit to convert a DC power from the power source 112 to an AC signal applied to the primary coil 110. Although not illustrated in FIG. 2, the power source 112 may include a conversion unit that converts an AC mains power to the DC power of the power source 112. Furthermore, the power signal generator 106 may be any type of power conversion circuit capable of providing an AC signal to the primary coil 110. For example, the power signal generator 106 may include the half-bridge circuit with parallel capacitors as shown in FIG. 2. Alternatively, the power signal generator 106 may include a full-bridge circuit. The power signal generator 106 also may be referred to as an inverter.

The power transmitter 102 also may include a wireless communication interface 114 and a communication coil 116. The wireless communication interface 114 may be configured to send or receive communication signals via the communication coil 116 (which may be a coil or a loop antenna, among other examples). The wireless communication interface 114 may implement short range radio frequency communication (such as Bluetooth™ or Near-Field Communication (NFC), among other examples). The wireless communication interface 114 may include logic for controlling one or more switches and other components that cause transmission and reception of wireless communication signals via the communication coil 116. The wireless communication interface 114 may be configured to communicate with the power receiver (not shown) using a wireless communication signal.

In some implementations, the wireless communication interface 114 may communicate with a power receiver by transmitting a wireless communication signal and detecting changes in the wireless communication signal that represent communication of information. The wireless communication interface 114 may support NFC Type 2 Tag specifications or NFC Type 4A Tag specifications, as specified by an NFC specification. During a power transfer phase besides the communications carrier the power signal is additionally active. Due to the frequency range used for the power signal, the inter-modulation products of the two signals result into interferences disturbing the reliable NFC communication. In order to avoid this unwanted effect, the power signal may be periodically switched-off for short time intervals. The time intervals may be referred to as communication time slots. Typically, the communication time slots may occur in relation to a zero-cross event associated with an AC cycle of an AC mains power or wall plug.

The power transmitter 102 also includes a PTX controller 108. The PTx controller 108 may control operation of the power signal generator 105. Furthermore, the PTx controller 108 may manage the state of the power transmitter 102 as the WPT transitions between various operating phases. The PTx controller 108 may communicate (such as transmit or receive communications) with the power receiver using the wireless communication interface 114. In some implementations, the PTx controller 108 may be implemented in an integrated circuit (IC). The PTx controller 108 may be implemented as a microcontroller, dedicated processor, integrated circuit, application specific integrated circuit (ASIC) or any other suitable electronic device. In some implementations, the wireless communication interface 114 and the PTx controller 108 may be implemented in a common unit.

The PTx controller 108 may detect the presence or proximity of a power receiver. In some implementations, the presence or proximity of the power receiver may be detected based on a load change in response to a periodic low power signal generated by the power signal generator 106 and the primary coil 110. In some implementations, the presence or proximity of the power receiver may happen during a periodic pinging process of the wireless communication interface 114 in the power transmitter 102. Alternatively, or additionally, the power transmitter 102 may detect the presence or proximity of the power receiver 118 based on a communication via a wireless communication signal associated with the wireless communication interface 114. For example, the power transmitter 102 may cause the wireless communication interface 114 to periodically or continually transmit a communication or polling signal. In some implementations, a wireless communication signal (transmitted by the wireless communication interface 114) may include a small amount of power (which may be referred to as a communication bias power or bias power) to power a one or more components of a power receiver.

The PTx controller 108 may control characteristics of wireless power that the power transmitter 102 provides to the power receiver. After detecting the power receiver 118, the PTx controller 108 may receive information from a power receiver (via the wireless communication interface 114). For example, the PTx controller 108 may receive the information as part of a handshake communication with the power receiver. A handshake communication (sometimes referred to as a digital handshake) refers to a one-to-one communication between the power receiver and the power transmitter 102. During the handshake communication, the power transmitter 102 may transmit a first communication signal and the power receiver may respond to the first communication signal by transmitting information (such as a power rating, the manufacturer, the model, or parameters of the receiver when operating on a standard transmitter, among other examples). The PTx controller 108 may use the information it receives from the power receiver to determine at least one operating control parameter (such as frequency, duty cycle, voltage, etc.) for wireless power it provides to the power receiver. To configure the wireless power, the PTx controller 108 may modify (shown as "A" and "B") the frequency, duty cycle, voltage or any other suitable characteristic of the power signal generator 106 during the power transfer phase.

Figure 3:
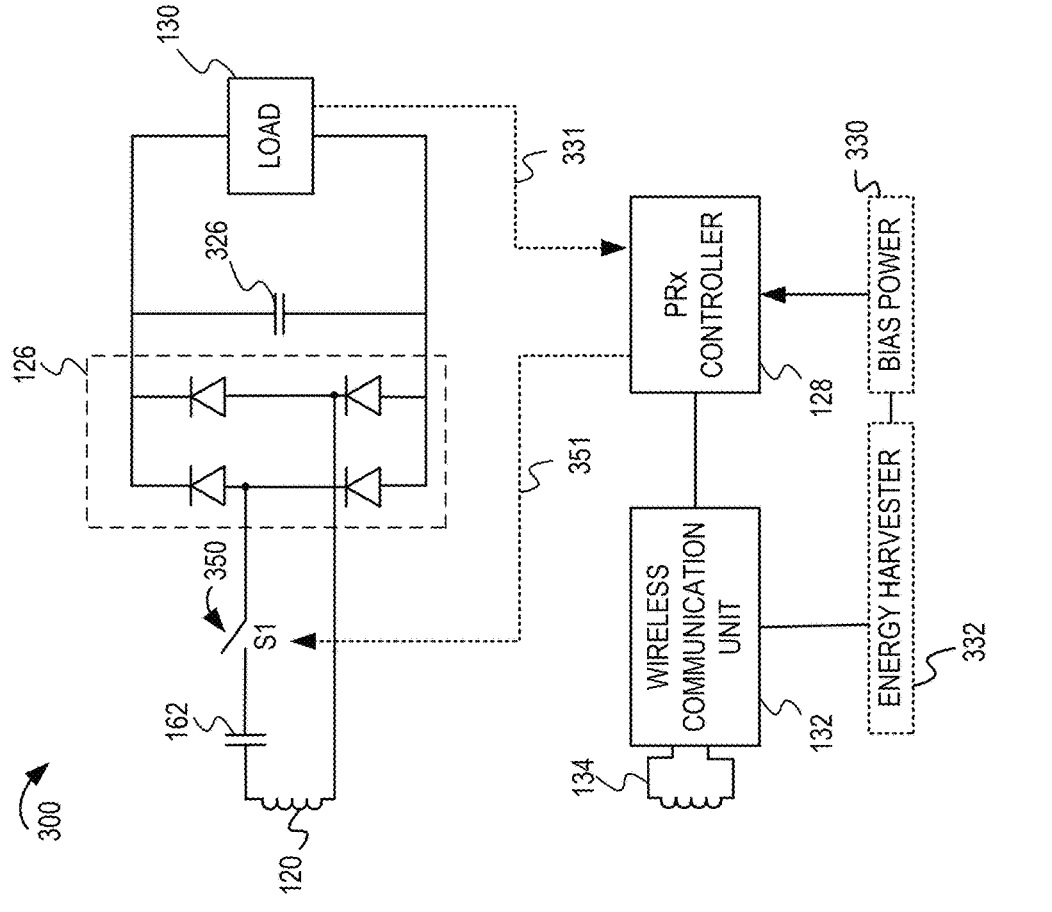
FIG. 3 shows a block diagram of an example power receiver with a protective switch.

FIG. 3 shows a block diagram of an example power receiver 300 with a protective switch. The example power receiver 300 may be an example of the power receiver 104 described with reference to FIG. 1. The power receiver 300 may include a load 130 or the load 130 may be an external component connected to the power receiver 300. The example rectifier 126 illustrated in FIG. 3 is a full bridge rectifier configured to convert a received power from an AC signal to a DC power used by the load 130. In some implementations, the power receiver 300 may not include a rectifier 126. Other types of rectifiers or power conversion units may be used in various implementations. Furthermore, the power receiver 300 illustrates an optional capacitor 326 coupled between the two legs of the rectifier 126. In some implementations, the power receiver 300 may not include the optional capacitor 326. FIG. 3 also shows a capacitor 162 that may be coupled to one or more legs of the secondary coil 120. The example power receiver 300 includes a protective switch (referred to as switch 350, also labeled as "S1"). The switch 350 may be connected in series between one leg of the secondary coil 120 and the rectifier 126. The switch 350 may be connected before or after the capacitor 162 when the capacitor 162 is present on that leg. The switch 350 is one type of protective switch described in this disclosure.

The power receiver 300 includes a communication coil 134, a wireless communication unit 132, and a PRx controller 128. The wireless communication unit 132 may be configured to receive a communication signal from a power transmitter. The wireless communication unit 132 may contain modulation and demodulation circuits to wirelessly communicate via the communication coil 134 (which may be a coil or a loop antenna, among other examples). Thus, the PRx controller 128 may wirelessly communicate with the power transmitter via the wireless communication unit 132. In some implementations, the wireless communication unit 132 may be configured to communicate using NFC or Bluetooth technology. The wireless communication unit 132 also may include or be coupled to an energy harvester 332 that can harvest energy from wireless communication signals and provide the harvested energy as bias power 330 to operate the PRx controller 128. The bias power 220 may be enough to power the wireless communication unit 132 but less than amount needed to power the load 130. The energy harvester 332 may be configured to provide harvested energy as bias power 330 to power the wireless communication unit 132, the PRx controller 128, or both. For example, communication signals received by the communication coil 134 may provide enough energy to produce a bias power 330 for startup and initial operation of the wireless communication unit 132 and the PRx controller 128 prior to a power transfer phase via the secondary coil 120. In some implementations, the bias power 330 also may be used to operate the switch 350. While the PRx controller 128 may be initially powered by the bias power 330, the PRx controller 128 also may be subsequently powered using power from the wireless power circuit during wireless power transfer phase. For brevity, FIG. 3 omits the circuits or components that connect the PRx controller 128 to obtain power from the wireless power circuit during wireless power transfer phase.

The PRx controller 128 may sense status of the load 130 using a sense signal 331. In some implementations, the sense signal 331 may be directly related to the load 130. Alternatively, or additionally, the sense signal 331 may indicate status of optional components, such as an activation switch (not shown) or a load switch (not shown). An activation switch may be based on a user interface such as a button, touchscreen, or any component that can indicate a user request to activate the load 130. The load switch (not shown) may include a temperature switch, overvoltage/overcurrent protection switch, motor lock, or any type of load-sensitive switch that controls whether the load 130 is active. The PRx controller 128 may control the switch 350 using a switch signal 351. In accordance with aspects of this disclosure, the PRx controller 128 may operate the switch signal 351 based on a WPT protocol that defines transitions between various operating phases of the WPT system. For example, the PRx controller 128 may cause the switch 350 to connect the secondary coil 120 to the rectifier 126 (or the load 130) according to a transition from a connected phase to a power transfer phase. Alternatively, or additionally, the PRx controller 128 may cause the switch 350 to disconnect the secondary coil 120 from the rectifier 126 (or the load 130) according to a transition from the power transfer phase to the connected phase. In some implementations, the switch 350 may be normally open (NO) such that the secondary coil 120 is disconnected from the rectifier 126 until the switch 350 is closed. In some implementations, the switch 350 may be closed using the bias power obtained from the wireless communication unit 132 or from power from a battery (not shown) included in the power receiver 300.

The wireless communication unit 132 may support NFC Type 2 Tag specifications or NFC Type 4A Tag specifications, as specified by an NFC specification. In some implementations, the wireless communication unit is configured to communicate with the power transmitter by storing information in a passive tag (such as an NFC Type 2 Tag) that can be read by a wireless communication interface of a power transmitter. Alternatively, wireless communication unit may be configured to communicate with the power transmitter by transmitting information (such as using an NFC Type 4A Tag) in a wireless communication signal to the wireless communication interface of the power transmitter.

The power receiver 300 shown in FIG. 3 may be example of one type of power receiver 300. For example, the power receiver 300 includes a rectifier 126 and may be suitable for an appliance in which the load 130 includes one or more motors or any load operated with DC power. Because the power receiver 300 includes the rectifier 126, the power receiver 300 may implement a type 0 control architecture as described herein. Other types of power receivers may not have motors and may not require the rectifier 126. For example, the load 130 may be a resistive load (such as a heating element) or any load which can be operated with AC power.

Figure 4:
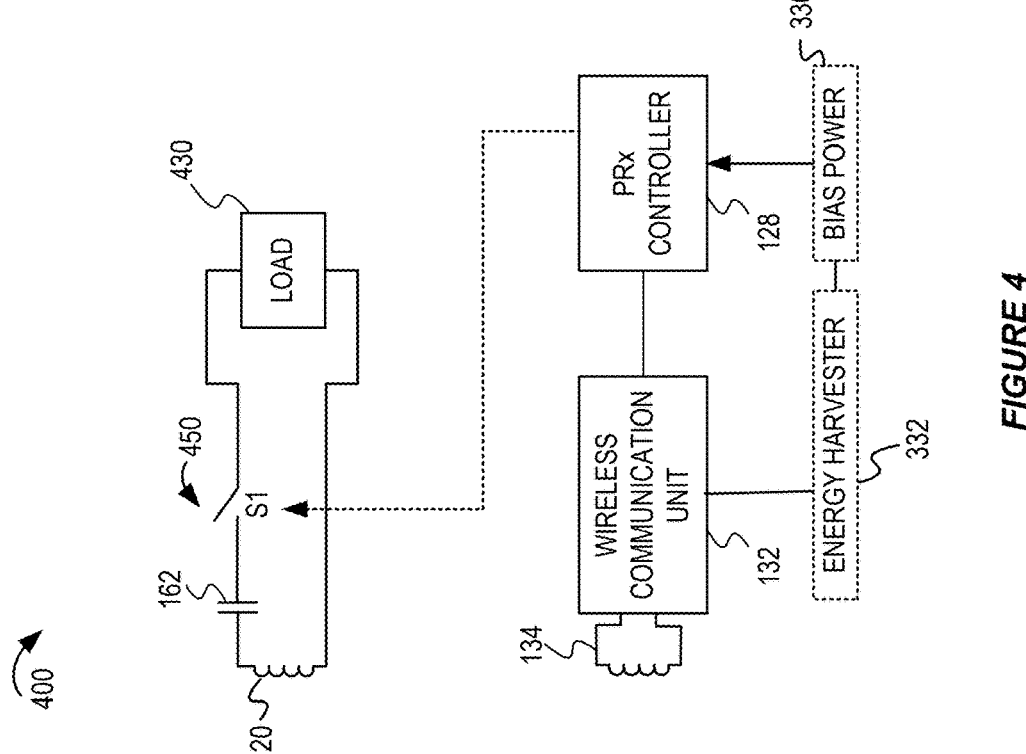
FIG. 4 shows a block diagram of another example power receiver with a protective switch.

FIG. 4 shows a block diagram of another example power receiver 400 with a protective switch. The example power receiver 400 may be another example of the power receiver 104 described with reference to FIG. 1. The components of the power receiver 400 may include components having like numbers as the power receiver 300 described with reference FIG. 3. However, the power receiver 400 may not include a rectifier because the load 430 is configured to operate using an AC signal obtained by the secondary coil 120. In this example, the load 430 may be referred to as a power reception circuit configured to utilize the power obtained by the secondary coil 120. The protective switch (switch 450) may be connected in series between the secondary coil 120 and the load 430 to prevent the load 430 from being damaged by an unexpected voltage induced in the secondary coil 120 when the load 430 is not being operated. The switch 450 is a type of protective switch described in this disclosure. Similar to the power receiver 300 described with reference to FIG. 3, the PRx controller 128 may be configured to manage the switch 450 based a WPT protocol that defines transitions between various operating phases of the WPT system. Because the power receiver 300 does not include a rectifier, the power receiver 300 may implement a type 1 control architecture as described herein.

Figure 5:
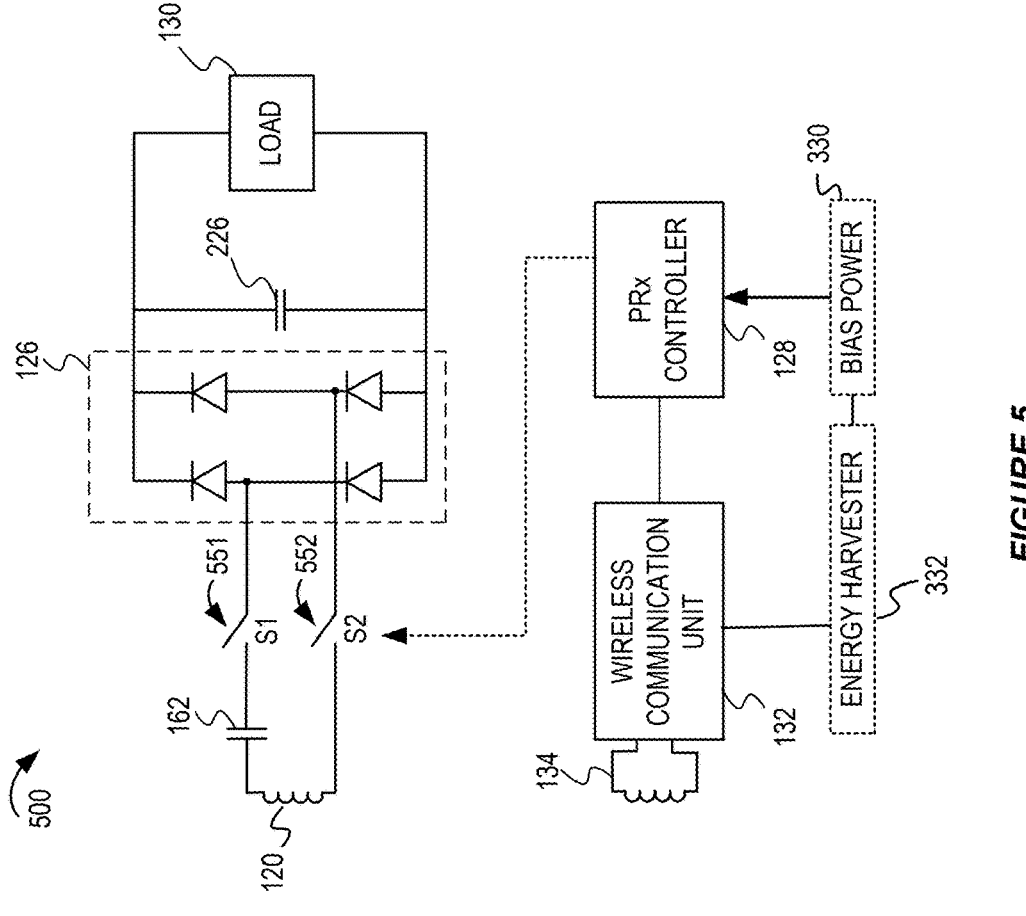
FIG. 5 shows a block diagram of an example power receiver with a protective switch comprising multiple switches.

FIG. 5 shows a block diagram of an example power receiver 500 with a protective switch comprising multiple switches. The components of the power receiver 500 may include components having like numbers as the power receiver 300 described with reference FIG. 3. Instead of a single series switch (such as the switch 350 described with reference to FIG. 3), the power receiver 500 may include first and second switches 551 and 552 connected in series between the legs of the secondary coil 120 and the rectifier 126. A first switch 551 (labeled as "S1") may be connected in series to a first leg of the secondary coil 120. A second switch 552 (labeled as "S2") may be connected in series to a second leg of the secondary coil 120. The first and second switches 551 and 552 also may be collective referred to as a protective switch. Similar to the power receiver 300 described with reference to FIG. 3, the PRx controller 128 may be configured to manage the switch 550 based a WPT protocol that defines transitions between various operating phases of the WPT system. Because the power receiver 500 includes the rectifier 126, the power receiver 500 may implement a type 0 control architecture as described herein.

The protective switches (such as switches 350, 450, 551 and 552 described with reference to FIGS. 3, 4, and 5, respectively) are examples of different types of protective switches implemented in a power receiver. Other types of protective switches may be used with the techniques of this disclosure. For example, a protective switch may include a shunt switch configured to short circuit the ends of a secondary coil to prevent or reduce an induced voltage in the secondary coil from reaching a power reception circuit. In this example, a first position of the shunt switch may be normally closed (to short-circuit the secondary coil) and a second position may open the shunt switch to permit the power to traverse from the secondary coil to the power reception circuit.

Figure 6:
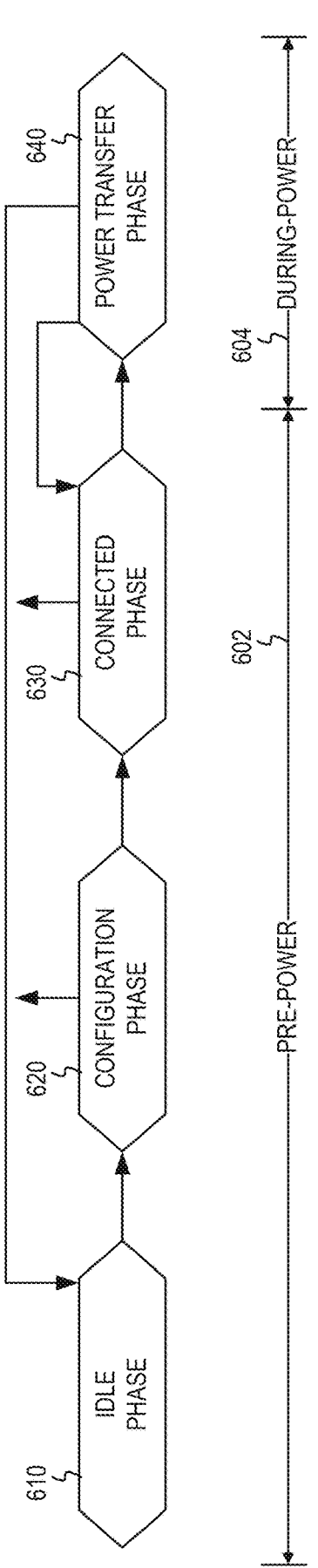
FIG. 6 shows a state diagram of various example operating phases of a WPT system.

FIG. 6 shows a state diagram 600 of various example operating phases of a WPT system. The state diagram 600 illustrates the operating phases in which the WPT system may operate. When a power receiver is placed within an interface surface of a power transmitter, the two start to communicate with the aim to configure and control the power transfer. There can be four operating phases associated with the WPT system: an idle phase 610 (sometimes also referred to as a ping phase), a configuration phase 620, a connected phase 630, and a power transfer phase 640. A technical specification may define how the power transmitter and power receiver can transition between the operating phases. For example, the WPT system typically begins in the idle phase 610, and can transition from the idle phase 610 to the configuration phase 620. From the configuration phase 620, the WPT system can transition to the connected phase 630. From the connected phase 630, the WPT system can transition to the power transfer phase 640. Furthermore, the WPT system can transition back to the idle phase 610 from any of the other phases (the configuration phase 620, the connected phase 630, or the power transfer phase 640), such as when a power receiver is removed from the interface surface. Each of the operating phases are briefly described herein for reference.

In the idle phase 610 (ping phase), the power transmitter tries to establish communications with a power receiver. The power receiver may be just placed on the interface surface or may not be present during this operating phase. The power transmitter may attempt to communicate or detect the presence of the power receiver. For example, the power transmitter may use an analog ping, out-of-band communication (such as NFC), a digital ping, or any combination thereof, to determine that a compatible power receiver is present. Once the WPT system determines that a power receiver is present (such as by confirming NFC communication), the WPT system may transition to the configuration phase 620.

In the configuration phase 620, the power receiver may send basic identification and configuration data to the power transmitter. For example, the power transmitter may retrieve static configuration information from the power receiver via the NFC communication. The power transmitter and the power receiver may use this information to verify that they both use compatible versions of a technical specification or protocol for wireless power transfer. The power transmitter and power receiver may communicate basic settings or communicate regarding their respective capabilities. From the configuration phase 620, the WPT system may transition to the connected phase 630.

In the connected phase 630, the power transmitter and the power receiver may exchange further communications to negotiate the parameters that govern the power transfer phase. After negotiating the parameters, the power transmitter may be prepared to transfer wireless power and the power receiver may be prepared to receive the wireless power. However, the power transmitter may wait for a request or command from the power receiver before transitioning to the power transfer phase 640. This may be useful, for example, when a cordless appliance (such as a blender, toaster, mixer, or microwave, among other examples) is configured for use pending a user interaction. The user may initiate the power transfer phase 640 by a user interface (such as an activation switch) of the power receiver, which in turn communicates to the power transmitter to transition to the power transfer phase 640.

In the power transfer phase 640, the power transmitter may transfer wireless power to the power receiver. Typically, the power transmitter will periodically perform a foreign object detection assessment during the power transfer phase 640. In some, the power transmitter may perform a foreign object detection assessment to ensure that no foreign objects are present before transitioning from the connected phase 630 to the power transfer phase 640. The power transmitter also may perform periodic foreign object detection assessments during the power transfer phase 640. The idle phase 610, the configuration phase 620, and the connected phase 630 may be collectively referred to as pre-power phases 602, while the power transfer phase 640 may be referred to as a during-power phase 604.

In some implementations, a transition from the connected phase to the power transfer phase and back may be a challenge due to hardware and safety procedure involved. For example, a cordless appliance may have a protective switch that should be turned to a second position before entering the power transfer phase. If a power transmitter were to begin wireless power transfer while the protective switch is still in the first position, the magnetic field from the power transmitter could lead to dangerous conditions or high voltages in the appliance. Furthermore, the power transmitter (or the power receiver) could experience a fault condition or damage. In some implementations, a power transmitter may be required to perform a foreign object detection (FOD) assessment before transitioning to the power transfer phase. The techniques of this disclosure may define a protocol to be followed during the transitions from connected mode to power transfer mode and vice versa.

This disclosure provides systems, methods and apparatuses for managing phase transitions of a wireless power transfer (WPT) system. For example, transitions between a connected phase and a power transfer phase may be coordinated in relation to changing a protective switch (one or more switches) in a power receiver. The protective switch may decouple or couple a secondary coil of the power receiver with a power reception circuit (such as a load or a rectifier). A first position of the protective switch may open a circuit that includes the secondary coil and the power reception circuit. A second position of the protective switch may close the circuit such that the secondary coil can receive the wireless power and provide the wireless power to the load during the power transfer phase. This disclosure also describes how a WPT system may temporarily pause wireless power transfer while remaining in a power transfer phase.

FIG. 7 shows a flowchart diagram of an example process 700 of a power receiver in accordance with some implementations. The operations of the process 700 may be implemented by a power receiver as described herein. For example, the operations of process 700 may be implemented by any of the power receivers 104, 300, 400, or 500 described with reference to FIG. 1, 3, 4, or 5, respectively. For brevity, the operations are described as performed by an apparatus. At block 710, the apparatus may determine that a PTx is in a connected phase of operation with the PRx. At block 720, the apparatus may cause, during the connected phase, a protective switch of the PRx to change from a first position to a second position, the protective switch disposed between a secondary coil of the PRx and a load associated with the PRx, wherein the first position is configured to normally open a circuit that includes the secondary coil before a power transfer phase of operation, wherein the second position is configured to close the circuit. At block 730, the apparatus may communicate a power request to the PTx after the protective switch is changed to the second position. At block 740, the apparatus may transition from the connected phase to the power transfer phase. At block 750, the apparatus may receive wireless power from the PTx during at least part of the power transfer phase.

FIG. 8 shows a flowchart diagram of an example process 800 of a power transmitter in accordance with some implementations. The operations of the process 800 may be implemented by a power transmitter as described herein. For example, the operations of process 800 may be implemented by any of the power transmitters 102 described with reference to FIGS. 1 and 2, respectively. For brevity, the operations are described as performed by an apparatus. At block 810, the apparatus may determine that a PRx is in a connected phase of operation with the PTx based, at least in part, on a communication with the PRx. At block 820, the apparatus may receive a power request from the PRx, the power request associated with requesting a transfer of wireless power from the PTx to the PRx, wherein the power request represents an indication that the PRx has changed a protective switch to close a circuit that includes a secondary coil of the PRx. At block 830, the apparatus may cause an inverter to generate a wireless power signal for the transfer of the wireless power in response to the power request. At block 840, the apparatus may transition from the connected phase to a power transfer phase of operation. At block 850, the apparatus may transmit the wireless power signal to transfer of the wireless power to the secondary coil of the PRx.

Figure 9:
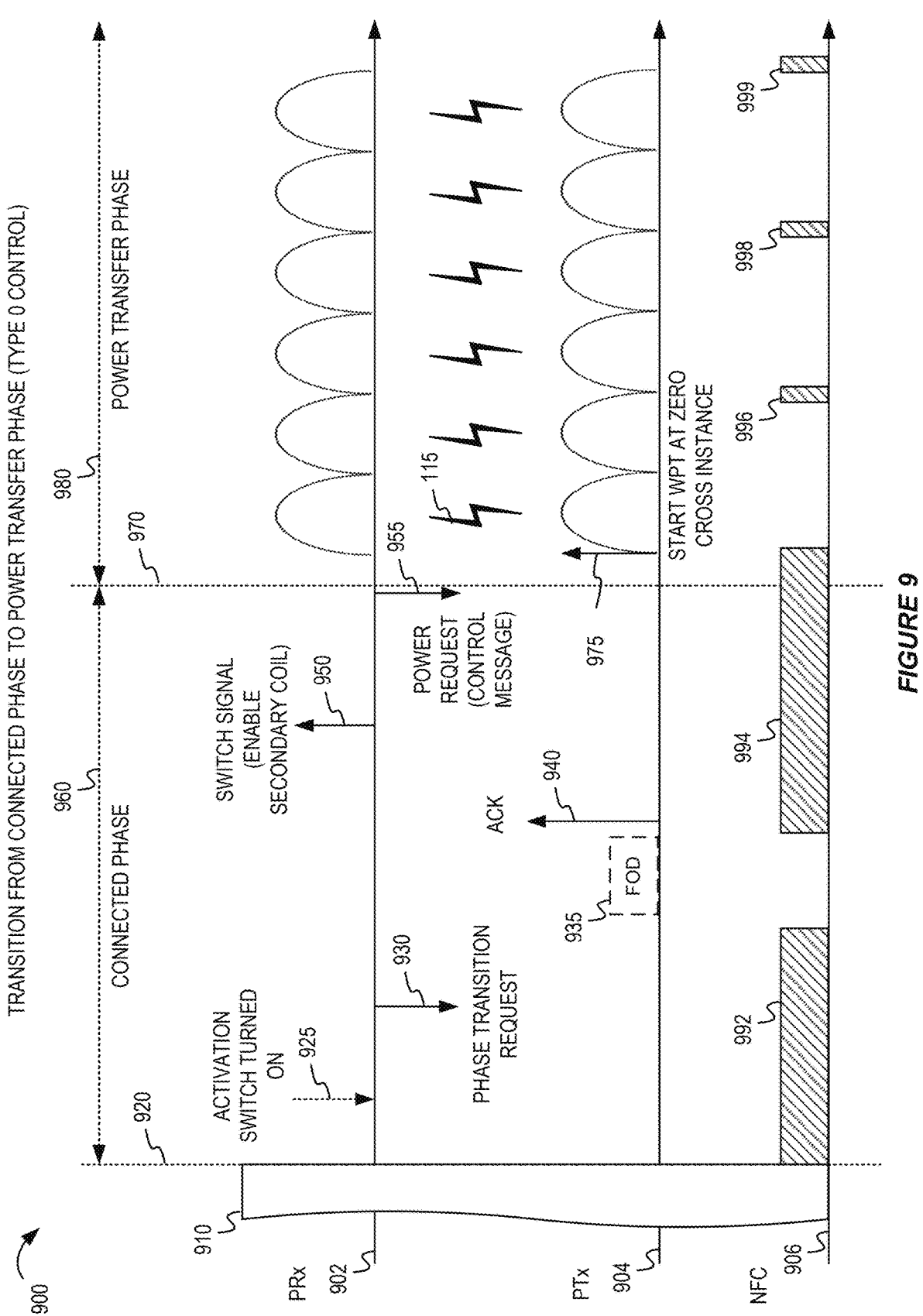
FIG. 9 shows a timing diagram of an example transition from a connected phase to a power transfer phase in a WPT system that uses type 0 control architecture.

FIG. 9 shows a timing diagram 900 of an example transition from a connected phase 960 to a power transfer phase 980 in a WPT system that uses type 0 control architecture. The timing diagram 900 is used to describe the operations of a PRx controller (labeled as PRx 902) and a PTx controller (labeled as PTx 904). The PRx 902 and the PTx 904 may implement a type 0 control architecture, meaning that the PRx 902 may control the wireless power transfer using control messages. For example, in the type 0 control architecture, the PRx 902 may control voltage, frequency, power, activation, deactivation, or other settings associated with the wireless power transfer. The PRx 902 and the PTx 904 may follow the state diagram of various operating phases, as described with reference to FIG. 6. The timelines for the PRx 902 and the PTx 904 assume that the WPT system has already transitioned (shown at line 920) to the connected phase 960. The phase operations 910 (such as idle phase and configuration phase) that occur before the connected phase 960 are omitted for brevity. At time 925, the PRx 902 may determine that an activation switch associated with the load has been turned on. For example, the activation switch may include user input indicating a desire to activate the load. Examples of the activation switch may include a button, a flip switch, a knob, or a touchscreen (and associated processor), among other examples. Some appliances may not include an activation switch and the PRx 902 may assume that the load is always ready to receive wireless power.

At time 930, the PRx 902 may communicate a phase transition request message. For example, the PRx 902 may communicate a "NEXT/pow" command (requesting the PTx 904 to transition to the power transfer phase as the next operating phase). The PTx 904 may respond to the phase transition request message with an acknowledgement message (shown at time 940). After receiving the acknowledgement message, the PRx 902 may send a switch signal (shown at time 950) to cause a protective switch to change from a first position to a second position. In the first position (which may be a default or "normal" position), the protective switch may disable a secondary coil of the PRx from conducting energy. For example, the first position may disconnect or decouple the secondary coil from a power reception circuit (such as a rectifier or load). The first position may open a circuit that includes the secondary coil. In the second position, the protective switch may enable the secondary coil to conduct energy-such as an induced voltage from a magnetic field generated by the PRx.

After the protective switch has changed to the second position (such as following a time for the protective switch to change to the second position after the switch signal at time 950), the PRx 902 may communicate a power request (sometimes also referred to as a power request message) to the PTx 904 at time 955. In some implementations, the power request may be included in a control message. The PTx 904 may receive the power request and enable a power signal generator (such as an inverter) of the PTx to being the transmission of wireless power 115. The PTx 904 also may transition (shown at time 970) to the power transfer phase

980 if it had not changed at the phase transition request (at time 930) or the power request (at time 955). While the definition of when the power transfer phase 980 begins may vary, the transmission of wireless power 115 may occur only after the power request at time 955 in some implementations. The power request may implicitly indicate that the PRx 902 has changed the protective switch to the second position. In some implementations, a WPT specification may define timing for the PRx 902 to couple the secondary coil to the load during the connected phase 960 and before the power request (at time 955) such that the power request explicitly or implicitly indicates that the PRx 902 has coupled the secondary coil to the load in accordance with the WPT specification. Thus, the wireless power 115 only occurs after the PTx 904 has confirmed (explicitly or implicitly) that the PRx 902 has configured a power reception circuit that includes the secondary coil and either a rectifier or load to consume the wireless power.

In some implementations, the power signal generator is enabled at or after the first natural zero cross (shown at time 975) of the AC main power or AC cycle following the power request. For systems that are operated off the grid (such as a DC operated PRx), the power signal generator may be enabled after a small delay after the power request control message 955 is received. Because the PTx 904 may wait for the power request, in accordance with this disclosure, the WPT system can avoid an overvoltage fault in the PTx or transmitting wireless power to an open circuit in the PTx.

FIG. 9 also shows an example timing for an FOD assessment 935 during the connected phase 960. Some power transmitters perform frequent FOD assessments in the connected phase whereas some others perform the FOD assessment just before entering the power transfer phase. In some implementations, the FOD assessment 935 may be required to be performed before transitioning from the connected phase to the power transfer phase. The FOD assessment 935 may occur in response to the phase transition request (at time 930) and before the acknowledgement (at time 940).

For an FOD assessment, the PTx 904 may scan for foreign objects using a variety of techniques, such as active excitation or passive excitation of foreign object detection coils to observe differences in impedance that indicate the presence of a foreign object. The PTx 904 may reset (or clear) a foreign object flag (FO) when no FO is detected and may set the FO flag when an FO is detected. A power transmitter may only scans for an FO before power transfer may have the FO flag set as an initial value to indicate that the FOD assessment has not been performed. After receiving the phase transition request (at time 930), the PTx 904 may check the status of the FO flag. If the FO flag is clear/reset and in the absence of other constraints, the PTx 904 may sends the acknowledgement (at time 940) to the PRx 902. If the FO flag is set, the PTx 904 may perform the FOD assessment 935. If a FO is detected, the PTx 904 may prompt a user action, transmit a fault condition, or otherwise disable the transition to the power transfer phase. For example, the PTx 904 may communicate a negative acknowledgement (NAK) to the PRx 902. Alternatively, if no FO is detected by the FOD assessment 935, and in the absence of other constraints, PTx 904 may communicate the acknowledgement (ACK) to the PRx 902.

FIG. 9 also illustrates how out-of-band communication (labeled as NFC 906) may relate to the timing of the operations of a PRx 902 and a PTx 904. For example, the NFC 906 timeline reflects times that the PTx 904 may communicate with the PRx 902. In some instances, the PTx 904 may communicate wireless communication signals according to the NFC 906 timeline and the PRx 902 may harvest energy (bias power) from the wireless communication signals. The NFC 906 timeline shows communication signals 992, 994, 996, 998, and 999. For example, communication signals 992 and 994 may occur during the connected phase 960 to provide bias power to the PRx 902. The communication signals may cease during the FOD assessment 935 so that the communication signals do not interfere with the FOD assessment 935. Furthermore, the NFC 906 timeline illustrates the communication signals 996, 998, and 999 that occur during communication time slots in the power transfer phase. The communication time slots may occur in relation to a zero-cross event associated with an AC cycle of a wireless power 115. Even during the instances 996, 998, and 999, the main power from the PTx 904 to the PRx 902 may be stopped to enable interference-free communication between PTx 904 and PRx 902.

It is noted that communication signals 994 may extend beyond the connected phase 960 and into the power transfer phase 980. This is so that the communication signals 994 can provide bias power for the PRx 902 until the wireless power 115 begins at time 975. After the wireless power 115 is being transferred from the PTx 904 to the PRx 902, the PRx 902 may utilize the wireless power 115 (rather than or in addition to bias power) to power the PRx controller.

Figure 10:
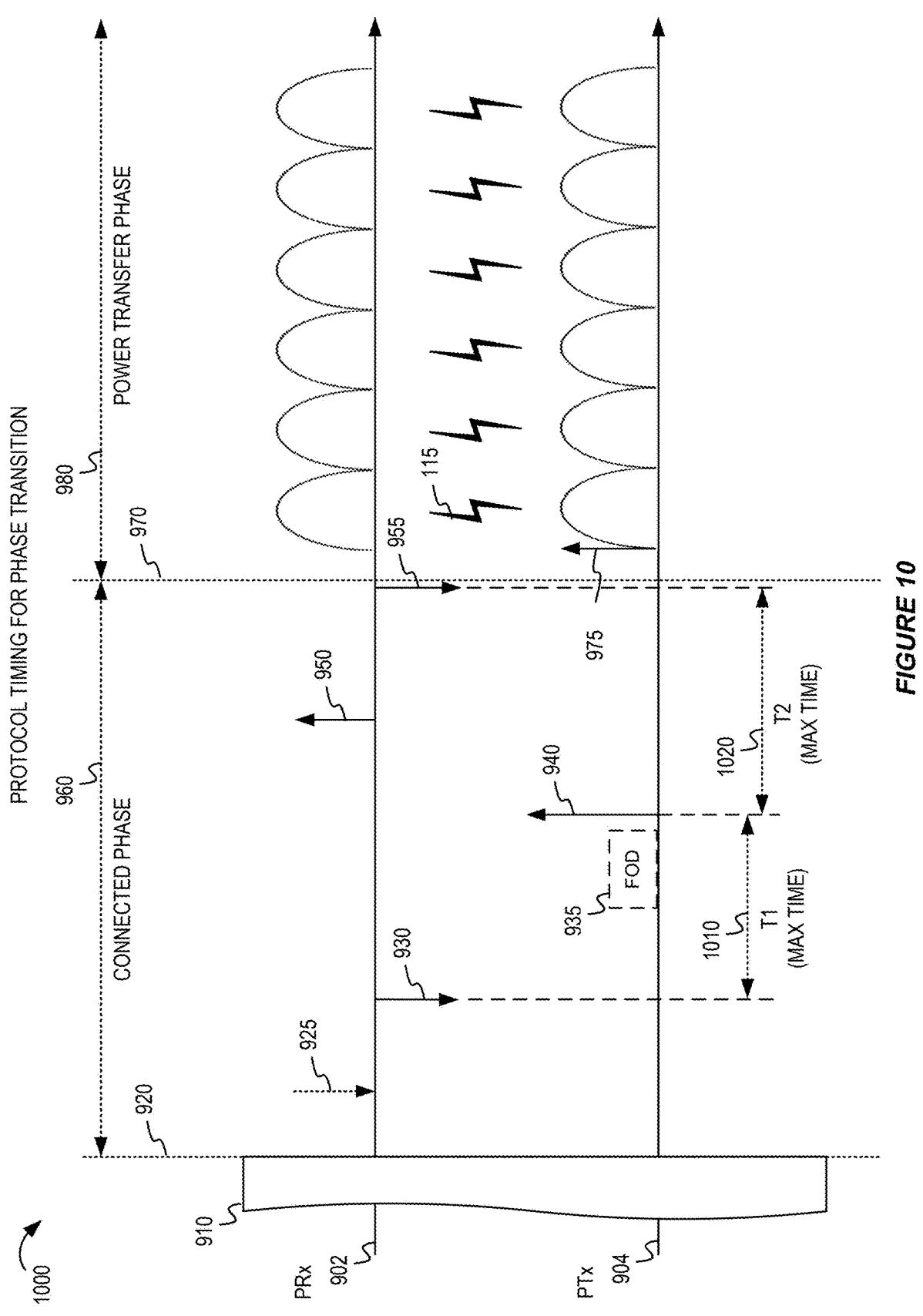
FIG. 10 shows a timing diagram in which a WPT protocol is defined with time limits.

FIG. 10 shows a timing diagram 1000 in which a WPT protocol is defined with time limits. The example operating phases, communications, and timing in FIG. 10 are similar to those described with like reference numbers in FIG. 9. FIG. 10 illustrates time limits that may be enforced as part of a WPT protocol that includes the phase transition request, acknowledgement message, or power request at times 925, 940, and 955, respectively. For example, the acknowledgement message at time 940 may be received within a limited time (labeled as T1 1010) following the phase transition request message at time 930. In some implementations, the value of T1 1010 may be 100 milliseconds (ms). T1 1010 may be a first maximum time allowed between the phase transition request message and the acknowledgement message. A timeout error may occur if the PRx 902 does not receive the acknowledgement message within the T1 1010. In such instances, the PRx 902 may wait a predetermined time and then send a new phase transition request (not shown). Alternatively, or additionally, the PRx 902 may present a timeout error indication via a user interface associated with the PRx 902. The PRx 902 may be required to send the power request (at time 955) within a limited time (labeled as T2 1020) following the acknowledgement (at time 940). In some implementations, the value of T2 1020 may be 100 ms. T2 1020 may be a second maximum time allowed between the acknowledgement message and the control message. If the PTx 904 does not receive the power request within the T2 1020, the PTx 904 may present a timeout error indication via a user interface associated with the PTx 904.

Figure 11:
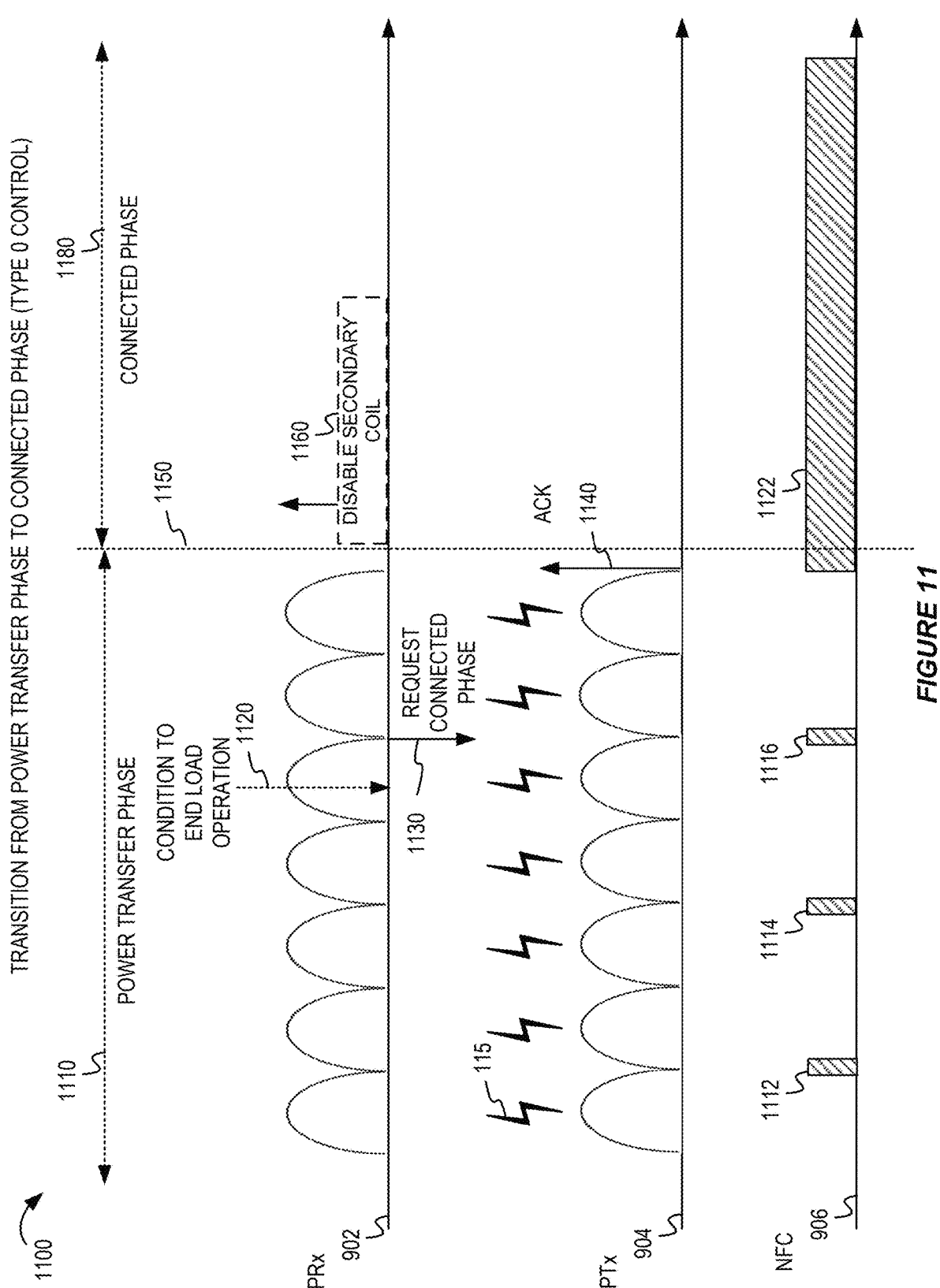
FIG. 11 shows a timing diagram of an example transition from a power transfer phase to a connected phase in a WPT system that uses type 0 control architecture.

FIG. 11 shows a timing diagram 1100 of an example transition from a power transfer phase 1110 to a connected phase 1180 in a WPT system that uses type 0 control architecture. The PRx 902 and the PTx 904 may be in power transfer phase 1110 following any procedure, such as the WPT protocol described with reference to FIG. 9 or 10. As with FIG. 9, the PRx 902 and the PTx 904 may implement a type 0 control architecture. The PTx 904 may be transmitting wireless power 115 to power a load associated with the PRx 902. At some point, the job associated with the load may be complete. Shown at time 1120, the PRx 902 may detect a condition associated with ending operation of the load. The condition may include an activation switch being turned off (such as by a user input or programmatically by a processor). Alternatively, the condition may include a load switch associated with the load changing to a state associated with ending operation of the load. For example, a load switch may include a temperature switch (such as a bimetallic switch) that turns off when the load has reached a target temperature. Alternatively, the load switch may also be any switch that disconnects the load from the wireless power reception circuit (secondary coil or rectifier).

After detecting the condition (at time 1120), the PRx 902 may communicate a phase transition request at time 1130. For example, the phase transition request may be a "NEXT/con" command (requesting the PTx 904 to transition to the connected phase as the next operating phase). In some implementations, a PTx 904 may not reject a phase transition request that requests a transition out of power transfer phase. After receiving the phase transition request, the PTx 904 may cease the transmission of wireless power 115 and may send an acknowledgement (ACK) message (shown at time 1140). The PTx 904 also may transition (shown at time 1150) to the connected phase 1180. The ACK message (at time 1140) may inform the PRx 902 that the PTx 904 has or will soon cease transmission of the wireless power 115. Ceasing transmission of the wireless power 115 may include the PTx 904 causing a power signal generator (such as an inverter of the PTx 904) and a primary coil of the PTx 904 to stop generating the magnetic field associated with the wireless power 115. In some implementations, a PTx 904 may not reject a phase transition request that requests a transition out of power transfer phase. However, if the PRx 902 does not receive the ACK message, the PRx 902 may communicate a new phase transmission request (NEXT/con) to attempt a protocol-conforming transition to the connected phase.

After receiving the ACK (at 1140), the PRx 902 may disable the secondary coil (shown at time 1160). For example, the PRx 902 may remove a switch signal that was keeping a protective switch closed. Alternatively, the PRx 902 may send a switch signal configured to cause the protective switch to open a circuit that includes the secondary coil. In some implementations, the PRx 902 may wait for a period of time after the ACK before disabling the secondary coil. In some implementations, the PRx 902 may include a voltage sensor configured to measure the voltage on the secondary coil. The PRx 902 may wait to open the circuit that includes the secondary coil until after the PRx 902 has confirmed that the voltage is below a threshold (indicative that the PTx 904 has ceased transmission of the wireless power 115). Thus, the time 1160 associated with disabling the secondary coil may vary, but ideally follows the ACK (at 1140) that indicates the wireless power 115 has or will soon cease. Using this technique, the PRx 902 can ensure that the protective switch is not inadvertently changed too early to a first position in which the secondary coil is disabled before the wireless power 115 has ceased. The components of the PRx 902 could be damaged by high currents or voltages or unintentional power transfer if the protective switch is changed before the wireless power 115 has ceased. In a situation where the PRx 902 does not receive an ACK from the PTx 904 after attempting multiple phase transition requests (NEXT/con), the PRx 902 may proceed with disabling the secondary coil.

FIG. 11 also illustrates how out-of-band communication (labeled as NFC 906) may relate to the timing of the operations of a PRx 902 and a PTx 904 during a transition from the power transfer phase 1110 to the connected phase

1180. The NFC 906 timeline illustrates the communication signals 1112, 1114, and 1116 that occur during communication time slots in the power transfer phase 1110. The communication time slots may occur in relation to a zero-cross event associated with an AC cycle of a wireless power 115. It is noted that communication signals 1122 may begin when the wireless power 115 transfer ceases (at time 1140). This is so that the communication signals 1122 can provide bias power for the PRx 902. In some implementations, the communication signals 1122 may begin during the power transfer phase 1110 (after wireless power 115 transfer) before the PTx 904 transitions (at time 1150) to the connected phase 1180. This is because the wireless power 115 may end at a natural zero cross instance associated with the AC mains power or AC cycle while the transition to the connected phase (at time 1150) may occur later.

Figure 12:
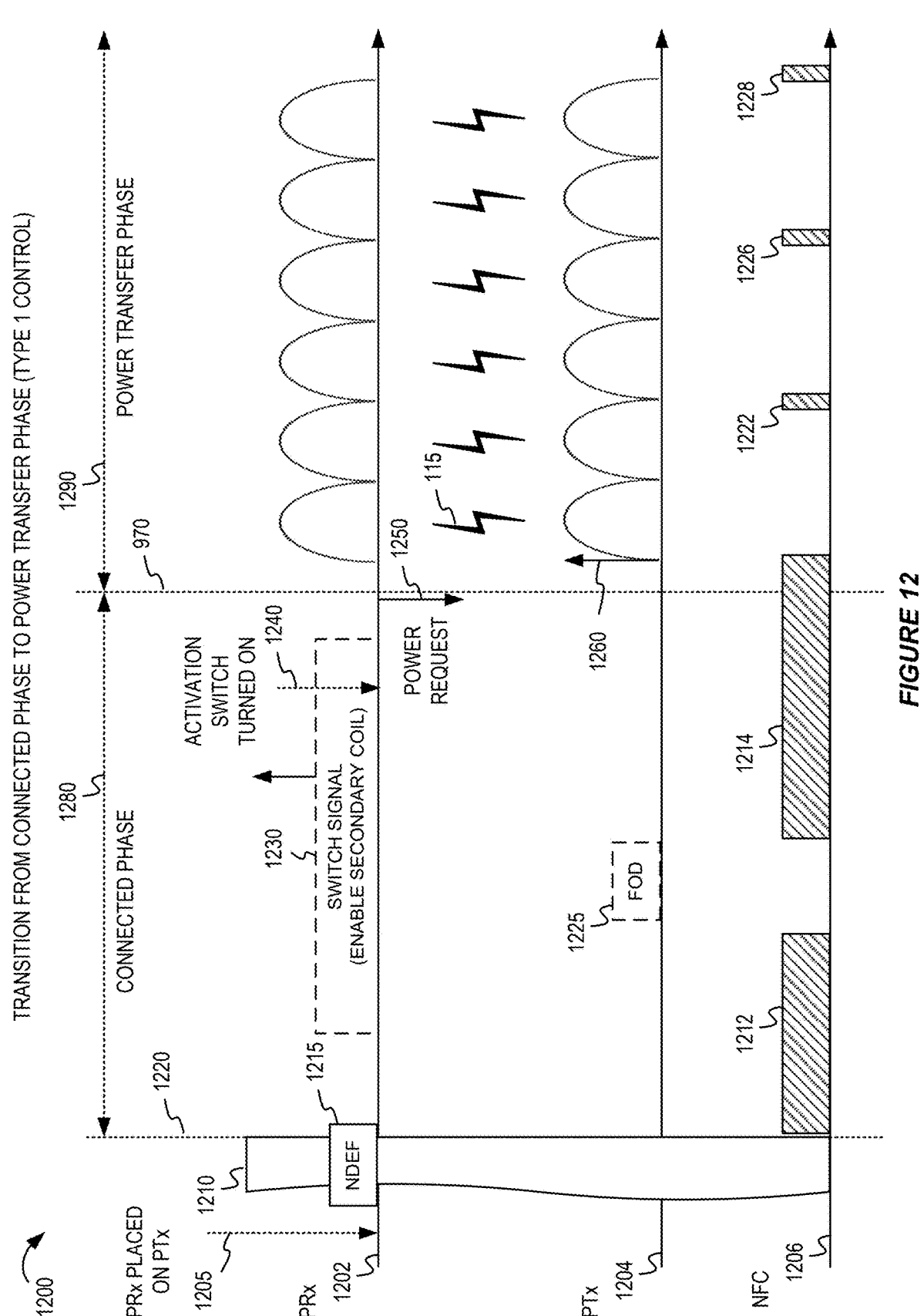
FIG. 12 shows a timing diagram of an example transition from a connected phase to a power transfer phase in a WPT system that uses type 1 control architecture.
Figure 13:
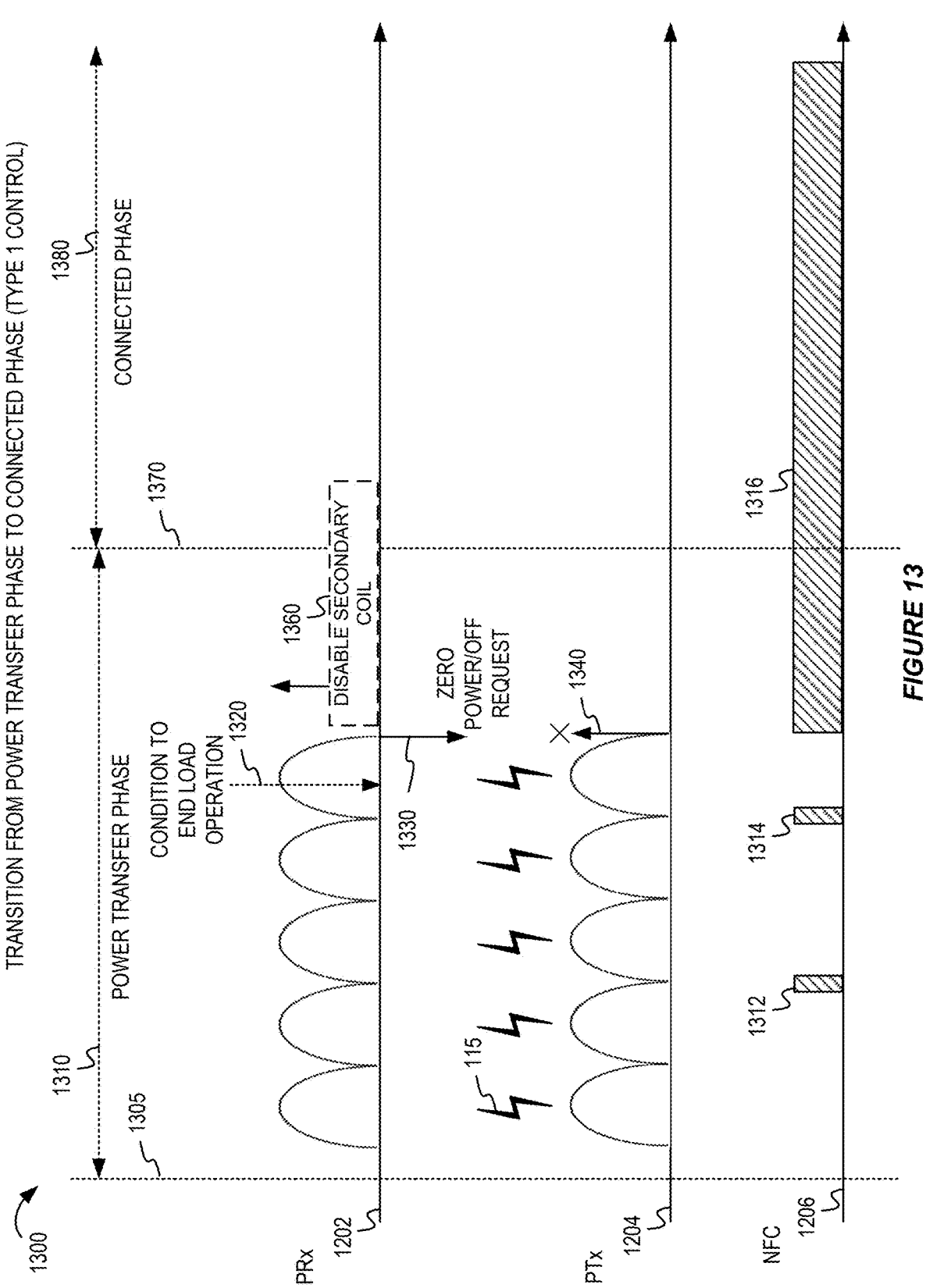
FIG. 13 shows a timing diagram of an example transition from a power transfer phase to a connected phase in a WPT system that uses type 1 control architecture.

The examples in FIGS. 9-11 may relate to a WPT system that implements type 0 control architecture. However, some WPT systems may implement a type 1 control architecture. FIGS. 12-13 illustrate how such systems may coordinate timing of various phase transitions.

FIG. 12 shows a timing diagram 1200 of an example transition from a connected phase 1280 to a power transfer phase 1290 in a WPT system that uses type 1 control architecture. The timing diagram 1200 is used to describe the operations of a PRx controller (labeled as PRx 1202) and a PTx controller (labeled as PTx 1204). In FIG. 11, the PRx 1202 and the PTx 1204 may implement a type 1 control architecture, meaning that the PRx 1202 may have limited control over the wireless power transfer. For example, in the type 1 control architecture, the PRx 1202 may use a passive tag (such as an NFC Type 2 Tag) to communicate limited information to the PTx 1204 and may rely on the PTx 1204 to control the wireless power transfer using an internal power control loop of the PTx 1204. The PRx 1202 and the PTx 1204 may follow the state diagram of various operating phases, as described with reference to FIG. 6. The timelines for the PRx 1202 and the PTx 1204 assume that the WPT system has already transitioned (shown at time 1220) to the connected phase 1280. The phase operations 1210 (such as idle phase and configuration phase) that occur before the connected phase 1280 are omitted for brevity. Those phase operations 1210 may include NFC Data Exchange Format (NDEF) 1215 communications. In some implementations, communication between the PRx 1202 and the PTx 1204 may be based on limited communication in which a wireless communication interface of the PTx 1204 "reads" information from a wireless communication unit of the PRx 1202. For example, the wireless communication unit may be a passive tag (such as an NFC Type 2 Tag) that stores information readable by the wireless communication interface of the PTx 1204.

At time 1240, the PRx 1202 may determine that an activation switch associated with the load has been turned on. For example, the activation switch may include user input indicating a desire to activate the load. Some appliances may not include an activation switch and the PRx 1202 may assume that the load is always ready to receive wireless power. The PRx 1202 may communicate a power request (at time 1250) only after the secondary coil has been enabled (shown at time 1230). The secondary coil may be enabled by the PRx 1202 sending a switch signal to cause a protective switch to change from a first position to a second position. In the first position, the protective switch may open a circuit that includes the secondary coil. In the second position, the protective switch may close a circuit that includes the secondary coil. The exact timing for enabling the secondary coil may vary based on the type of appliance and manufacturer preference. In some implementations, the PRx 1202 may cause the protective switch to change to the second position as soon as the PRx 1202 enters the connected phase 1280. Alternatively, the PRx 1202 may cause the protective switch to change to the second position after the activation switch is turned on.

After receiving the power request (at time 1250), the PTx 1204 may begin transmitting wireless power 115 (shown as beginning at time 1260). For example, the PTx 1204 may cause a power signal generator (such as an inverter) to generate a wireless power signal for transmission by a primary coil of the PTx 1204. In some implementations, the power signal generator is enabled at or after the first natural zero cross (shown at time 1260) of the AC main power or AC cycle following the power request (at time 1250). Because the PRx 1202 may require the protective switch to be closed (at time 1230) before communicating the power request (at time 1250), the PTx 1204 may wait for the power request, in accordance with this disclosure, the WPT system can avoid an overvoltage fault in the PRx 1202 and can void transmitting wireless power 115 to an open circuit in the PRx 1202. In some implementations, a WPT specification may define timing for the PRx 1202 to couple the secondary coil to the load during the connected phase 1280 and before the power request (at time 1250) such that the power request implicitly indicates that the PRx 1202 has coupled the secondary coil to the load in accordance with the WPT specification.

As described with reference to FIG. 9, the PTx 1204 may perform an FOD assessment 1225 (similar to FOD assessment 935 in FIG. 9) during the connected phase 1280. The timing of the FOD assessment 1225 may vary since it may not be triggered by a communication form the PRx 1202. However, in some implementations, the WPT specification may require the PTx 1204 to perform the FOD assessment 1225 before transitioning from the connected phase to the power transfer phase or before the transmission of wireless power 115. If a FO is detected, the PTx 1204 may prompt a user action, transmit a fault condition, or otherwise disable the transition to the power transfer phase.

FIG. 12 also illustrates how out-of-band communication (labeled as NFC 1206) may relate to the timing of the operations of a PRx 1202 and a PTx 1204. For example, the NFC 1206 timeline reflects times that the PTx 1204 may transmit wireless communication signals 1212, 1214, 1222, 1226, and 1228 to communicate with the PRx 1202 or to support bias power harvesting of the PRx 1202. For example, communication signals 1212 and 1214 may occur during the connected phase 1280 to provide bias power to the PRx 1202. The communication signals may cease during the FOD assessment 1225 so that the communication signals do not interfere with the FOD assessment 1225. Furthermore, the NFC 1206 timeline illustrates the communication signals 1222, 1226, and 1228 that occur during communication time slots in the power transfer phase 1290 during which the main power from PRx to PTx may be temporarily ceased. The communication time slots may occur in relation to a zero-cross event associated with an AC cycle of a wireless power 115.

As described with reference to FIG. 9, the communication signals 1214 may extend beyond the connected phase 1280 and into the power transfer phase 1290. This is so that the communication signals 1214 can provide bias power for the PRx 1202 until the wireless power 115 begins at time 1260. After the wireless power 115 is being transferred from the PTx 1204 to the PRx 1202, the PRx 1202 may utilize the wireless power 115 (rather than or in addition to bias power) to power the PRx controller.

FIG. 13 shows a timing diagram 1300 of an example transition from a power transfer phase to a connected phase in a WPT system that uses type 1 control architecture. The PRx 1202 and the PTx 1204 may be in power transfer phase 1310 following any procedure, such as the WPT protocol described with reference to FIG. 12. As with FIG. 12, the PRx 1202 and the PTx 1204 may implement a type 1 control architecture. The PTx 1204 may be transmitting wireless power 115 to power a load associated with the PRx 1202. At some point, the job associated with the load may be complete. Shown at time 1320, the PRx 1202 may detect a condition associated with ending operation of the load. The condition may include an activation switch being turned off or a load switch associated with the load changing to a state associated with ending operation of the load, among other examples.

After detecting the condition (at time 1320), the PRx 1202 may communicate a zero power or power off request at time 1330. For example, the PRx 1202 may modify information in the passive tag such that the PTx 1204 receives the zero power or power off request by reading the passive tag. After receiving the zero power or power off request (at time 1330), the PTx 1204 may cease (shown at time 1340) the transmission of wireless power 115. The PTx 1204 also may transition (shown at time 1370) to the connected phase 1380. Ceasing transmission of the wireless power 115 may include the PTx 1204 causing a power signal generator (such as an inverter of the PTx 1204) and a primary coil of the PTx 1204 to stop generating the magnetic field associated with the wireless power 115.

The PRx 1202 also may disable the secondary coil (shown at time 1360). For example, the PRx 1202 may remove a switch signal that was keeping a protective switch closed. Alternatively, the PRx 1202 may send a switch signal configured to cause the protective switch to open a circuit that includes the secondary coil. In some implementations, the PRx 1202 may wait for a period of time after the zero power or power off request to allow time for the PTx 1204 to cease transmitting the wireless power 115. Thus, the time 1360 associated with disabling the secondary coil may vary provided it follows the zero power or power off request (at 1330).

FIG. 12 also illustrates how out-of-band communication (labeled as NFC 1206) may relate to the timing of the operations of a PRx 1202 and a PTx 1204 during a transition from the power transfer phase 1310 to the connected phase 1380. The NFC 1206 timeline illustrates the communication signals 1312 and 1314 that occur during communication time slots in the power transfer phase 1310. The communication time slots may occur in relation to a zero-cross event associated with an AC cycle of a wireless power 115. It is noted that communication signals 1316 may begin when the wireless power 115 transfer ceases (at time 1340). This is so that the communication signals 1316 can provide bias power for the PRx 1202. In some implementations, the communication signals 1316 may begin during the power transfer phase 1310 (after wireless power 115 transfer) before the PTx 1204 transitions (at time 1150) to the connected phase 1380. This is because the wireless power 115 may end at a natural zero cross instance associated with the AC mains power or AC cycle while the transition to the connected phase 1380 may occur later.

The foregoing description describes transitions between a connected phase and a power transfer phase. Stated another way, the descriptions describe the timing associated with wireless power transfer in relation to a protective switch. There may be some implementations in which it is desirable to stay in a power transfer phase while temporarily pausing the transmission of wireless power. For example, some appliances have a load associated with an on-cycle and an off-cycle. Transitioning between the connected phase and the power transfer phase may be less efficient than temporarily pausing transmission of wireless power to support an off-cycle of the load. An example of an appliance with such a load may be an ice crusher. The ice crusher may have a motor that implements a series of on-cycles and off-cycles. An example of an appliance with such a load may be blender with a pulse sequence. There exists a need for a PRx to manage the periodic transmission of wireless power during a power transfer phase. This disclosure also describes how a WPT system may temporarily pause wireless power transfer while remaining in a power transfer phase. The techniques may include the use of one or more zero power requests and non-zero power requests.

FIG. 14 shows a flowchart diagram of an example process 1400 of a power receiver to control wireless power delivery during a power transfer phase in accordance with some implementations. The operations of the process 1400 may be implemented by a power receiver as described herein. For example, the operations of process 1400 may be implemented by any of the power receivers 104, 300, 400, or 500 described with reference to FIG. 1, 3, 4, or 5, respectively. For brevity, the operations are described as performed by an apparatus. At block 1410, the apparatus may couple a secondary coil of the PRx to a load associated with an on-cycle and an off-cycle, the secondary coil configured to receive wireless power from a PTx during at least part of a power transfer phase of operation. At block 1420, the apparatus may communicate with the PTx to enter a power transfer phase in which the PTx can transfer wireless power to the PRx. At block 1430, the apparatus may communicate a non-zero power request to the PTX in association with the on-cycle of the load, the non-zero power request associated with causing the PTx to transfer the wireless power. At block 1440, the apparatus may communicate a zero power request message to the PTX in association with the off-cycle of the load, the zero power request associated with causing the PTx to pause the transfer of the wireless power while remaining in the power transfer phase.

FIG. 15 shows a flowchart diagram of an example process 1500 of a power transmitter to control wireless power delivery during a power transfer phase in accordance with some implementations. The operations of the process 1500 may be implemented by a power transmitter as described herein. For example, the operations of process 1500 may be implemented by any of the power transmitters 102 described with reference to FIGS. 1 and 2, respectively. For brevity, the operations are described as performed by an apparatus. At block 1510, the apparatus may communicate with a PRx to enter a power transfer phase of operation. At block 1520, the apparatus may receive a power request from the PRx, the power request for controlling a transfer of wireless power for a load of the PRx during at least part of the power transfer phase. At block 1530, the apparatus may cause an inverter of the PTx to generate a wireless power signal for the transfer of the wireless power for the load in the power transfer phase when the power request is a non-zero power request. At block 1540, the apparatus may cause the inverter to pause generation of the wireless power signal for the load while remaining in the power transfer phase when the power request is a zero power request.

Figure 16:
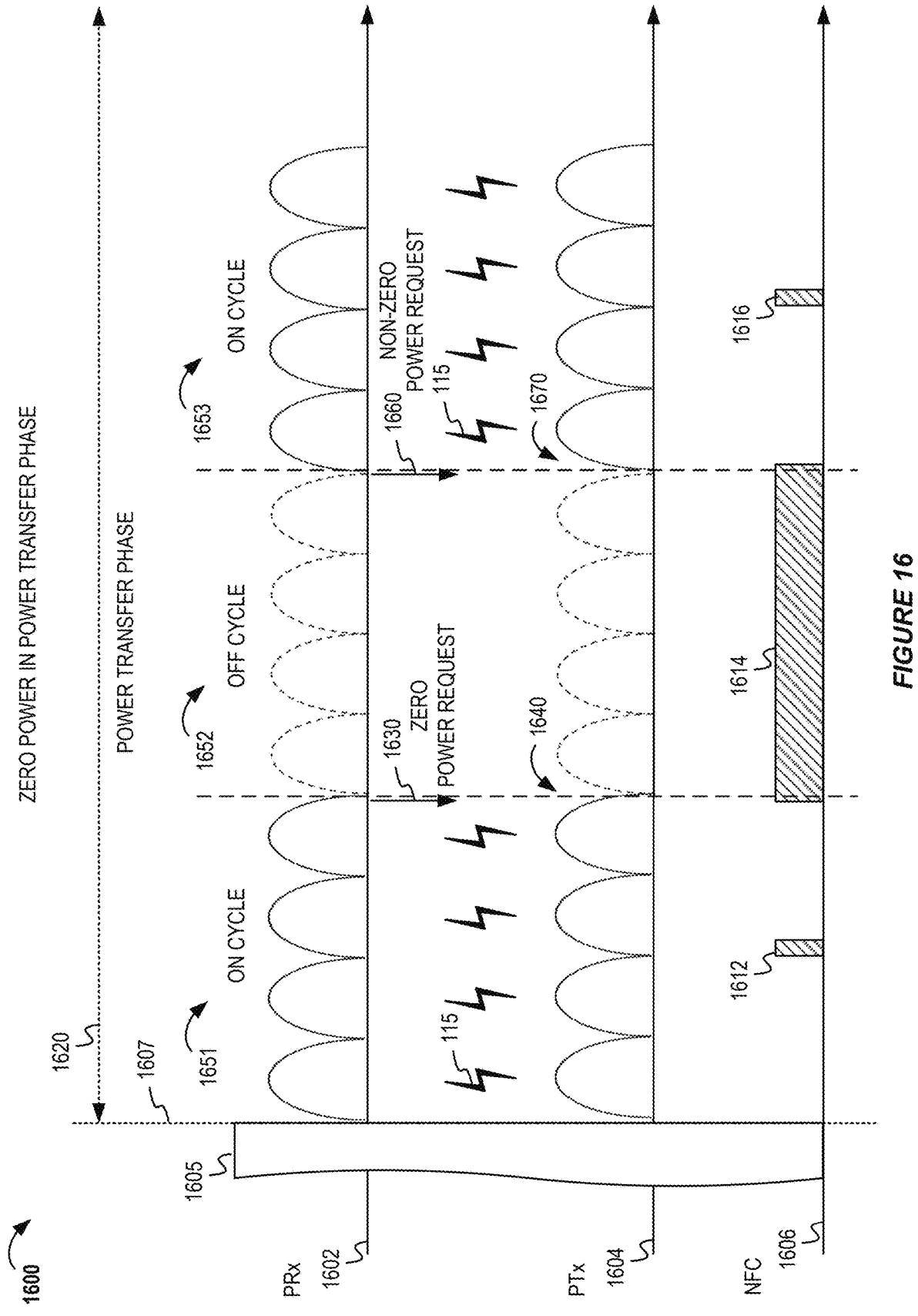
FIG. 16 shows a timing diagram in which a zero power request and a non-zero power request are used during a power transfer phase.

FIG. 16 shows a timing diagram 1600 in which a zero power request and a non-zero power request are used during a power transfer phase 1620. The timing diagram 1600 is used to describe the operations of a PRx controller (labeled as PRx 1602) and a PTx controller (labeled as PTx 1604). In FIG. 16, the PRx 1602 and the PTx 1604 may implement either a type 0 control architecture or a type 1 control architecture. The PRx 1602 and the PTx 1604 may follow the state diagram of various operating phases, as described with reference to FIG. 6. The timelines for the PRx 1602 and the PTx 1604 assume that the WPT system has already transitioned (shown at line 1607) to the power transfer phase 1620. The phase operations 1605 (such as idle phase, configuration phase, and connected phase) that occur before the power transfer phase 1620 are omitted for brevity.

The timing diagram 1600 begins at a time when the load associated with the PRx 1602 is in an on-cycle 1651. During the on-cycle 1651, a load may be consuming wireless power 115 for operation of the load (such as a motor of an ice crusher or blender, among other examples). However, the load may have an off cycle 1652 during which time the load does not require wireless power. It is desirable to cease transmission of wireless power during the off cycle 1652 to protect damage to the PRx 1602 or load, conserve energy, and extend the lifespan for electronic components. However, it also may be desirable to remain in the power transfer phase 1620 since the next on cycle 1653 will occur soon after the off cycle 1652. Thus, in some aspects, this disclosure provides a technique to temporarily pause the transmission of wireless power during an off-cycle associated with a load of a PRx 1602.

The PRx 1602 may communicate a zero power request (shown at time 1630) to cause the PTx 1604 to cease transmission of the wireless power 115. The zero power request may be communicated by modifying information in a passive tag or by transmitting a communication signal that includes the zero power request from the PRx 1602. In implementations where the PRx 1602 has a protective switch, the PRx 1602 may keep the protective switch enabled such that a circuit that includes the secondary coil remains closed during the power transfer phase. After receiving the zero power request from the PRx 1602, the PTx 1604 may cease transmission (shown at time 1640) of the wireless power 115. For example, the PTx 1604 may cause a power signal generator (such as an inverter) to turn off.

As the off cycle 1652 ends, the PRx 1602 may communicate a non-zero power request (at time 1660) to cause the PTx 1604 to resume transmission of the wireless power 115. After receiving the non-zero power request (at time 1660) from the PRx 1602, the PTx 1604 may resume transmission (shown at time 1670) of the wireless power 115. For example, the PTx 1604 may cause a power signal generator (such as an inverter) to turn on.

It is noted that the zero power request and the non-zero power request may be referred to by other terms. Furthermore, as described further with reference to FIG. 17, the "zero" power request may indicate a nominal non-zero power setting but it is referred to as a zero power request herein for clarity. In some implementations, the PRx 1602 may communicate a series of zero power requests and non-zero power requests that correspond with the beginning of off-cycles and on-cycles, respectively, of the load. Furthermore, the zero power requests and non-zero power requests may be communicated according to a preconfigured duty cycle or setting associated with the load such that a user does not need to continually press or release an activation switch.

FIG. 16 also illustrates how out-of-band communication (labeled as NFC 1606) be used during a time period between a zero power request and a non-zero power request. The NFC 1606 timeline illustrates the communication signals 1612 and 1616 that occur during communication time slots in the power transfer phase 1620. The communication time slots may occur in relation to a zero-cross event associated with an AC cycle of a wireless power 115. Furthermore, the PTx 1604 may transmit communication signals 1614 during a time period between a zero power request (at time 1630) and a non-zero power request (at time 1660). This is so that the communication signals 1614 can provide bias power for the PRx 1602. Recall that in some implementations, the bias power may be used to operate a protective switch that closes a circuit of the secondary coil. Thus, FIG. 16 provides a technique in which the protective switch may remain in the second position even when the wireless power 115 is not transmitted during the off-cycle 1652.

Figure 17:
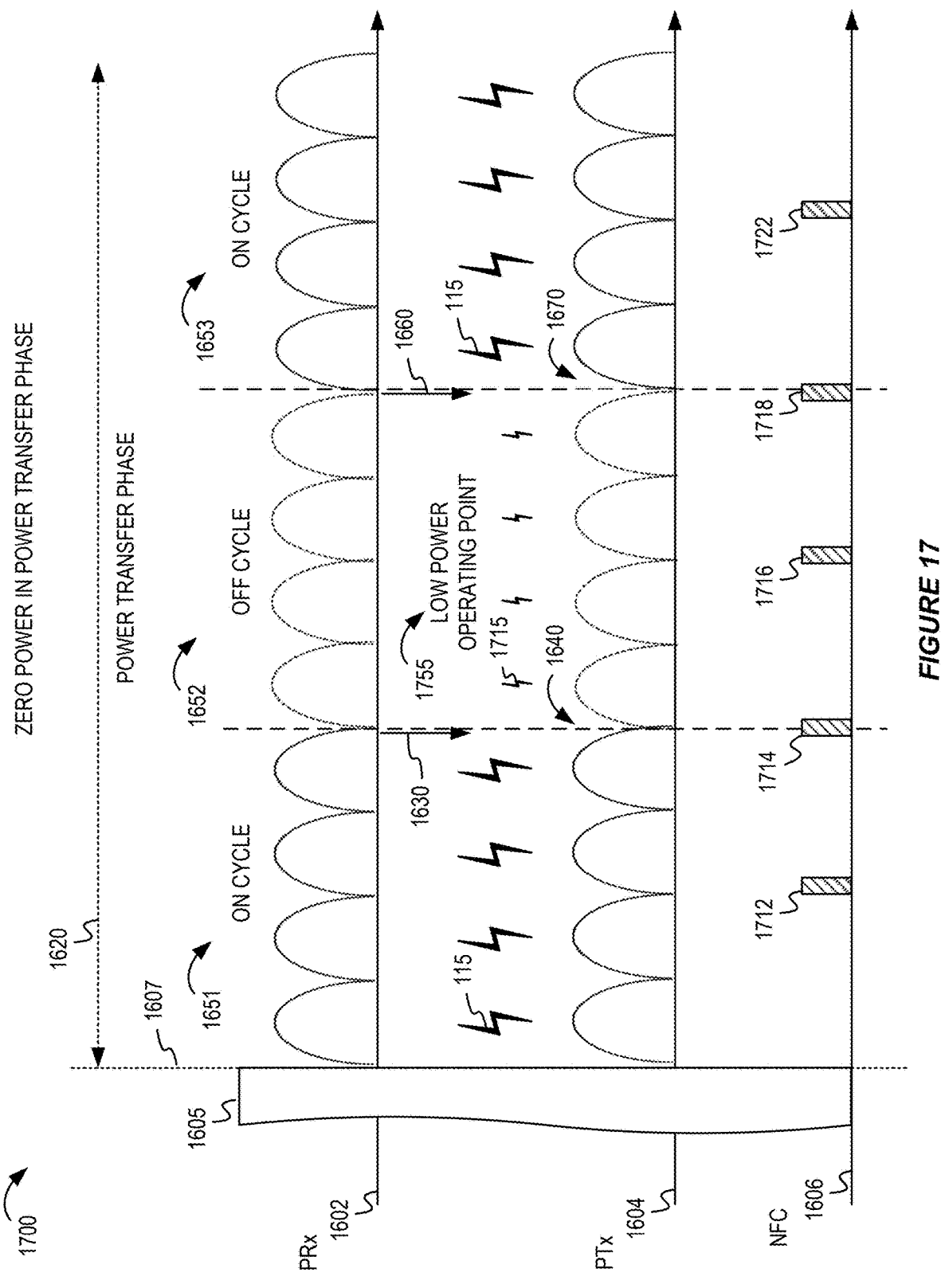
FIG. 17 shows a timing diagram in which a low power operating point may be used while remaining in a power transfer phase.

FIG. 17 shows a timing diagram 1700 in which a low power operating point may be used while remaining in a power transfer phase. Features of FIG. 17 have the same meaning as described with reference to FIG. 16, including the PRx 1602, PTx 1604, NFC 1606, phase operations 1605, line 1607, power transfer phase 1620, on cycle 1651, off cycle 1652, on cycle 1653, zero power request (at time 1630), non-zero power request (at time 1660), pausing transmission of wireless power 115 at time 1640, and resuming transmission of wireless power 115 at time 1670. Significant in FIG. 17 is that, when the PTx 1604 pauses transmission of wireless power 115 for use by the load, the PTx 1604 may not entirely cease wireless power transmission. Rather, the PTx 1604 may transmit wireless power 1715 at a low power operating point 1755. The low power operating point may be an uncritical operating point (UOP) or a safe communication operating point (SCOP). The wireless power 1715 at the low power operating point 1755 may be an amount of power that is lower than required for the load but sufficient to power a PRx controller or other components of the PRx 1602. Specifically, in some implementations, the wireless power 1715 at the low power operating point 1755 may be sufficient to keep a protective switch activated to close the circuit that includes the secondary coil of the PRx 1602. Recall that in some implementations, the protective switch is operated by wireless power during a power transfer phase. Thus, FIG. 17 provides a technique in which the protective switch may remain in the second position during the off-cycle 1652 while also benefiting from the zero power and non-zero power request to define an off cycle 1652 of the load. The NFC 1606 may be used for communications 1712, 1714, 1716, 1718, and 1722 that would normally occur during the communication time slots in the power transfer phase 1620. For example, the communication time slots may be instances when the PRx 1602 may communicate a zero power request, a non-zero power request, or any type of control message associated with the transmission of wireless power 115.

Figure 18:
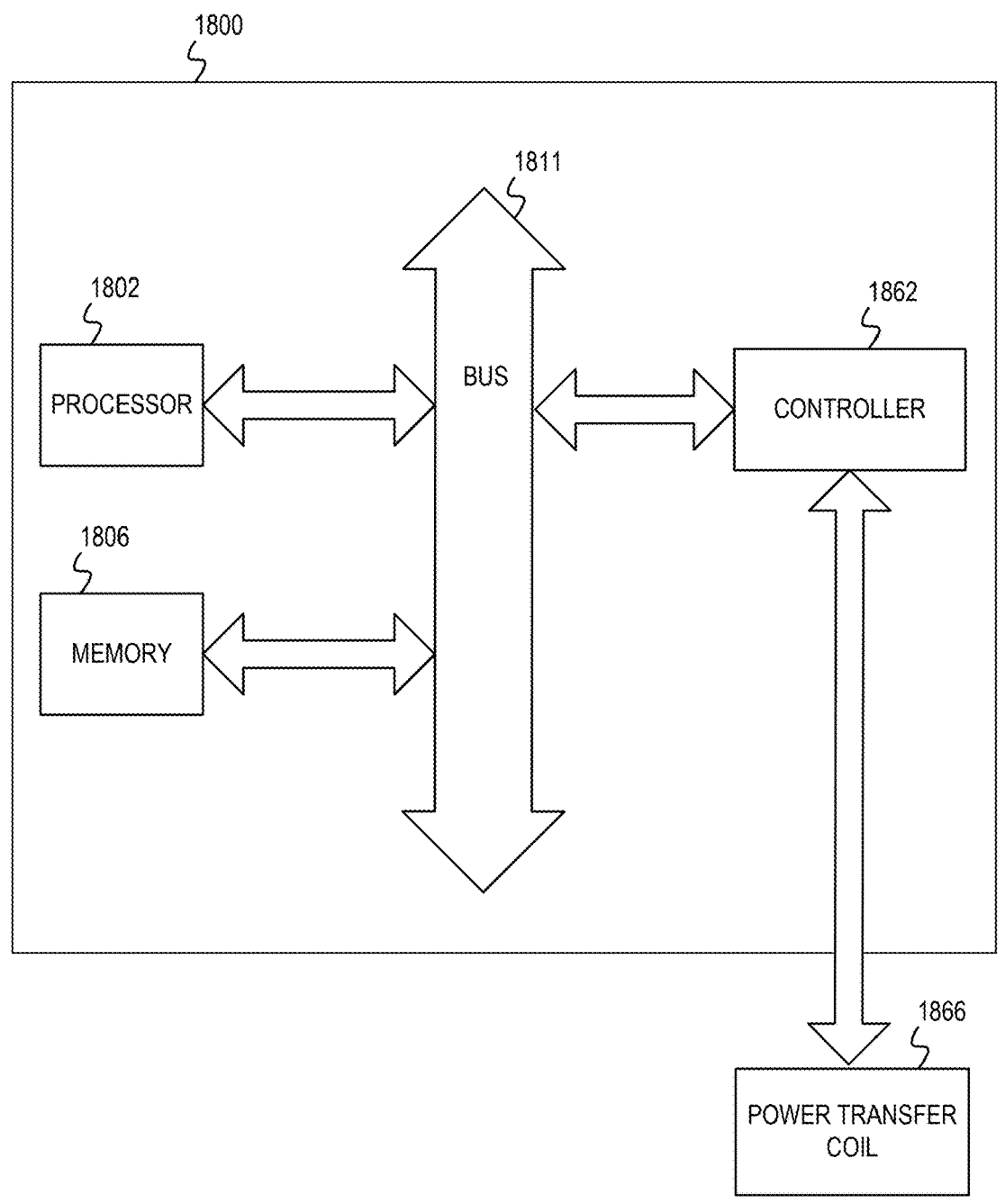
FIG. 18 shows a block diagram of an example apparatus for use in wireless power transfer system.

FIG. 18 shows a block diagram of an example apparatus 1800 for use in wireless power transfer system. In some implementations, the apparatus 1800 may be a power receiver, such as any of the power receivers described herein. In some implementations, the apparatus 1800 may be a power transmitter, such as any of the power transmitters described herein. The apparatus 1800 can include a processor 1802 (possibly including multiple processors, multiple cores, multiple nodes, or implementing multi-threading, etc.). The apparatus 1800 also can include a memory 1806. The memory 1806 may be system memory or any one or more of the possible realizations of computer-readable media described herein. The apparatus 1800 also can include a bus 1811 (such as PCI, ISA, PCI-Express, HyperTransport®, InfiniBand®, NuBus®, AHB, AXI, etc.). In some implementations, the controller(s) 1862 can be distributed within the processor 1802, the memory 1806, and the bus 1811. The controller(s) 1862 may perform some or all of the operations described herein. The apparatus 1800 may include other components not illustrated in FIG. 18. For example, if the apparatus 1800 is a power receiver, the apparatus may have one or more switches (protective switch) in a circuit that includes the power transfer coil 1866.

The memory 1806 can include computer instructions executable by the processor 1802 to implement the functionality of the implementations described with reference to FIGS. 1-17. Any one of these functionalities may be partially (or entirely) implemented in hardware or on the processor 1802. For example, the functionality may be implemented with an application specific integrated circuit, in logic implemented in the processor 1802, in a co-processor on a peripheral device or card, etc. Further, realizations may include fewer or additional components not illustrated in FIG. 18. The processor 1802, the memory 1806, and the controller(s) 1862 may be coupled to the bus 1811. Although illustrated as being coupled to the bus 1811, the memory 1806 may be coupled to the processor 1802.

FIGS. 1-18 and the operations described herein are examples meant to aid in understanding example implementations and should not be used to limit the potential implementations or limit the scope of the claims. Some implementations may perform additional operations, fewer operations, operations in parallel or in a different order, and some operations differently.

The foregoing disclosure provides illustration and description but is not intended to be exhaustive or to limit the aspects to the precise form disclosed. Modifications and variations may be made in light of the above disclosure or may be acquired from practice of the aspects. While the aspects of the disclosure have been described in terms of various examples, any combination of aspects from any of the examples is also within the scope of the disclosure. The examples in this disclosure are provided for pedagogical purposes. Alternatively, or in addition to the other examples described herein, examples include any combination of the following implementation options (identified as clauses for reference).

Clause 1. A power receiver (PRx) of a wireless power transfer (WPT) system, the PRx including: a secondary coil configured to receive wireless power from a power transmitter (PTx) during at least part of a power transfer phase of operation; a protective switch disposed between the secondary coil and a load associated with the PRx, where the protective switch is normally in a first position configured to open a circuit that includes the secondary coil before the power transfer phase; and a wireless communication unit; and the PRx controller configured to: determine that the PTx is in a connected phase of operation with the PRx, generate, during the connected phase, a switch signal configured to cause the protective switch to change to a second position, where the second position is configured to close the circuit that includes the secondary coil, cause the wireless communication unit to communicate a power request for the PTx to transmit the wireless power after the protective switch is changed to the second position; and transition from the connected phase to the power transfer phase.

Clause 2. The PRx of clause 1, where the protective switch being in the second position enables the secondary coil to receive the wireless power and provide the wireless power to the load during the power transfer phase.

Clause 3. The PRx of any one of clauses 1-2, where the wireless communication unit is configured to communicate with the PTx by storing information in a passive tag that can be read by a wireless communication interface of the PTx, and where the PRx controller is configured to cause the wireless communication unit to communicate the power request by modifying the information in the passive tag to include a power on indication.

Clause 4. The PRx of any one of clauses 1-2, where the wireless communication unit is configured to communicate with the PTx by transmitting information to a wireless communication interface of the PTx, and where the PRx controller is configured to cause the wireless communication unit to transmit the power request in a control message to the PTx.

Clause 5. The PRx of clause 4, where the PRx controller is further configured to, during the connected phase: cause the wireless communication unit to transmit a phase transition request message associated with requesting the PTx to transition to the power transfer phase, receive, via the wireless communication unit, an acknowledgement message from the PTx in response to the phase transition request message, and cause the wireless communication unit to transmit the power request in the control message after receiving the acknowledgement message.

Clause 6. The PRx of clause 5, where the PRx controller is further configured to: detect whether an activation switch associated with the load has been turned on, and refrain from causing the wireless communication unit to transmit the phase transition request message until after the activation switch has been turned on.

Clause 7. The PRx of any one of clauses 5-6, where the phase transition request message, the acknowledgement message, and the control message are associated with a WPT specification that defines when the protective switch is changed from the first position to the second position such that the protective switch is changed to the second position before the control message.

Clause 8. The PRx of clause 7, where the WPT specification defines: a first maximum time allowed between the phase transition request message and the acknowledgement message, and a second maximum time allowed between the acknowledgement message and the control message.

Clause 9. The PRx of any one of clauses 1-8, where the PRx controller is further configured to: determine that an activation switch associated with the load has been turned on, and cause the PTx to transition to the power transfer phase after the activation switch has been turned on and the protective switch is in the second position.

Clause 10. The PRx of any one of clauses 1-9, further including: an energy harvester that is integrated with or operatively coupled to the wireless communication unit, the energy harvester configured to: harvest a bias power from communication signals received by a communication coil associated with the wireless communication unit, and provide the bias power to the PRx controller at least during the connected phase to power the PRx controller.

Clause 11. The PRx of clause 10, where the PRx controller is powered by the bias power during the connected phase and is at least partially powered by the wireless power during the power transfer phase.

Clause 12. The PRx of any one of clauses 10-11, where the switch signal is at least initially generated using the bias power.

Clause 13. The PRx of any one of clauses 1-12, where the PRx controller is further configured to: detect a condition associated with ending operation of the load, where the condition includes a load switch disconnecting the load or an activation switch being turned off, cause the PTx and the PRx to transition from the power transfer phase to the connected phase based on the condition, and cause the protective switch to change to the first position in association with a transition from the power transfer phase to the connected phase.

Clause 14. The PRx of clause 13, where the wireless communication unit is configured to communicate with the PTx by storing information in a passive tag that can be read by a wireless communication interface of the PTx; and where the PRx controller is configured to: cause the PTx to transition to the connected phase by modifying the information in the passive tag to indicate a zero power or power off request, and cause the protective switch to change to the first position after modifying the information in the passive tag.

Clause 15. The PRx of clause 13, where the wireless communication unit is configured to communicate with the PTx by transmitting information to a wireless communication interface of the PTx; and where the PRx controller is configured to: cause the wireless communication unit to transmit a second phase transition request message associated with requesting the PTx to transition to the connected phase, receive, via the wireless communication unit, a second acknowledgement message from the PTx in response to the second phase transition request message, the second acknowledgement message indicative that the PTx has or will transition to the connected phase, and cause the protective switch to change to the first position after receiving the second acknowledgement message.

Clause 16. The PRx of any one of clauses 1-15, where the PRx controller is further configured to: cause the wireless communication unit to communicate a zero power request message associated with pausing a transfer of wireless power for the load while remaining in the power transfer phase, and cause the wireless communication unit to communicate a non-zero power request message associated with resuming the transfer of wireless power for the load after a time period.

Clause 17. The PRx of clause 16, further including: an energy harvester that is integrated with or operatively coupled to the wireless communication unit, the energy harvester configured to harvest a bias power from communication signals received by a communication coil associated with the wireless communication unit in the power transfer phase during a time period between the zero power request message and the non-zero power request message.

Clause 18. The PRx of clause 16, where the zero power request message is associated with requesting a transfer of wireless power at an uncritical operating point (UOP) or safe commutation operating point (SCOP) that is lower than required by the load but sufficient to power the PRx controller or other components of the PRx.

Clause 19. The PRx of any one of clauses 16-18, where the load is operated with an on-cycle and an off-cycle, where a duration of the time period is associated with the off-cycle, and where the duration spans one or more alternating current (AC) power cycles.

Clause 20. A power receiver (PRx) of a wireless power transfer (WPT) system, the PRx including: a secondary coil operatively coupled to a load associated with an on-cycle and an off-cycle, the secondary coil configured to receive wireless power from a power transmitter (PTx) during at least part of a power transfer phase of operation; a wireless communication unit; and a PRx controller configured to: cause the wireless communication unit to communicate with the PTx to enter the power transfer phase in which the PTx can transfer the wireless power, cause the wireless communication unit to communicate a non-zero power request associated with causing the PTx to transfer the wireless power in association with the on-cycle of the load, and cause the wireless communication unit to communicate a zero power request message associated with causing the PTx to pause the transfer of the wireless power in association with the off-cycle of the load while remaining in the power transfer phase.

Clause 21. The PRx of clause 20, where the load is associated with a series of on-cycles and off-cycles, and where the PRx controller is configured to manage the transfer of the wireless power using non-zero power requests and zero power requests associated with the on-cycles and off-cycles, respectively.

Clause 22. The PRx of any one of clauses 20-21, further including: an energy harvester that is integrated with or operatively coupled to the wireless communication unit, the energy harvester configured to harvest a bias power from communication signals received by a communication coil associated with the wireless communication unit in the power transfer phase during a time period associated with the off-cycle.

Clause 23. The PRx of any one of clauses 20-22, where the zero power request message is associated with requesting the transfer of wireless power at an uncritical operating point (UOP) or safe commutation operating point (SCOP) that is lower than required by the load but sufficient to power the PRx controller or other components of the PRx.

Clause 24. A power transmitter (PTx) of a wireless power transfer (WPT) system, the PTx including: an inverter configured to generate a wireless power signal; a primary coil operatively coupled to the inverter and configured to transmit the wireless power signal in association with a transfer of wireless power to a secondary coil of a power receiver (PRx); a wireless communication interface configured to communicate with a wireless communication unit of the PRx; and a PTx controller configured to: determine that the PRx is in a connected phase of operation with the PTx, receive, via the wireless communication interface, a power request for the PTx to transmit the wireless power, where the power request represents an indication that the PRx has changed the protective switch to close a circuit that includes the secondary coil of the PRx, cause the inverter to generate the wireless power signal for the transfer of the wireless power in response to the power request; and transition from the connected phase to a power transfer phase of operation.

Clause 25. The PTx of clause 24, where a WPT specification defines timing for the PRx to couple the secondary coil to the load during the connected phase and before the power request for wireless power such that the power request implicitly indicates that the PRx has coupled the secondary coil to the load in accordance with the WPT specification.

Clause 26. The PTx of any one of clauses 24-25, where the protective switch is disposed between the secondary coil and the load of the PRx, and where the protective switch is normally in a first position configured to open the circuit that includes the secondary coil; and where the PTx controller is configured to determine that the PRx has caused the protective switch to change to a second position based, at least in part, on the power request for wireless power, where the second position of the protective switch is configured to close the circuit that includes the secondary coil.

Clause 27. The PTx of any one of clauses 24-26, where the PTx controller is further configured to: perform a foreign object detection (FOD) assessment during the connected phase before causing the inverter to generate the wireless power signal.

Clause 28. The PTx of any one of clauses 24-27, where wireless communication interface is configured to communicate with the wireless communication unit of the PRx by reading information in a passive tag of the wireless communication unit, and where the PTx controller is configured to receive the power request via a power on indication in the information.

Clause 29. The PTx of any one of clauses 24-26, where the wireless communication interface is configured to receive a transmission from the wireless communication unit of the PRx, and where the PTx controller is configured to receive the power request via a control message in the transmission.

Clause 30. The PTx of clause 29, where the PTx controller is further configured to, during the connected phase: receive, via the wireless communication interface, a phase transition request message from the PRX, the phase transition request message associated with requesting the PTx to transition to the power transfer phase, cause the wireless communication interface to transmit an acknowledgement message to the PRx in response to the phase transition request message, and receive the control message after transmitting the acknowledgement message.

Clause 31. The PTx of clause 30, where the PTx controller is configured to perform an FOD assessment after the phase transition request message and before the acknowledgement message.

Clause 32. The PTx of any one of clauses 30-31, where the phase transition request message, the acknowledgement message, and the control message are associated with a WPT specification that defines timing for when the PRx closes the circuit that includes the secondary coil such that the circuit is closed before the control message.

Clause 33. The PTx of clause 32, where the WPT specification defines: a first maximum time allowed between the phase transition request message and the acknowledgement message, and a second maximum time allowed between the acknowledgement message and the control message.

Clause 34. The PTx of any one of clauses 32-33, where the WPT specification requires the PRx to couple the secondary coil to the load via the protective switch before the power request.

Clause 35. The PTx of any one of clauses 24-34, where the wireless communication interface is configured to transmit communication signals to the wireless communication unit of the PRx at least during the connected phase, where the communication signals are usable by the PRx to harvest a bias power to operate a PRx controller of the PRx.

Clause 36. The PTx of any one of clauses 24-35, where the wireless communication interface is configured to receive a zero power or power off request from information in a passive tag of the wireless communication unit of the PRx; and where the PTx controller is configured to: cause the inverter to cease generating the wireless power signal in response to the zero power or power off request, and transition to the connected phase.

Clause 37. The PTx of clause 36, where the PTx controller is further configured to cause the wireless communication interface to transmit communication signals to the wireless communication unit of the PRx after causing the inverter to cease generating the wireless power signal, where the communication signals are usable by the PRx to harvest a bias power to operate a PRx controller of the PRx.

Clause 38. The PTx of any one of clauses 24-35, where the wireless communication interface is configured to receive a second phase transition request message associated with requesting the PTx to transition to the connected phase; and where the PTx controller is configured to: cause the inverter to cease generating the wireless power signal, transition to the connected phase, cause the wireless communication interface to transmit a second acknowledgement message to the PRx in response to the second phase transition request message, the second acknowledgement message indicative that the PTx has or will transition to the connected phase.

Clause 39. The PTx of any one of clauses 24-38, where, during the power transfer phase, the wireless communication interface is configured to receive a zero power request message associated with pausing the transfer of wireless power for the load while remaining in the power transfer phase; and where the PTx controller is configured to: cause the inverter to cease generating the wireless power signal for the transfer of the wireless power for the load in response to receiving the zero power, and remain in the power transfer phase.

Clause 40. The PTx of clause 39, where, during the power transfer phase, the wireless communication interface is configured to subsequently receive a non-zero power request message associated with resuming the transfer of the wireless power for the load; and where the PTx controller is configured to cause the inverter to resume generating the wireless power signal for the transfer of the wireless power for the load in response to receiving the non-zero power request.

Clause 41. The PTx of clause 40, where the PTx controller is further configured to cause the wireless communication interface to transmit communication signals to the wireless communication unit of the PRx after causing the inverter to cease generating the wireless power signal, where the communication signals are usable by the PRx to harvest a bias power to operate a PRx controller of the PRx in the power transfer phase during a time period between the zero power request message and the non-zero power request message.

Clause 42. The PTx of any one of clauses 39-40, where the zero power request message is associated with requesting a transfer of wireless power at an uncritical operating point (UOP) or safe commutation operating point (SCOP) that is lower than required for the load but sufficient to power a PRx controller or other components of the PRx, and where the PTx controller is configured to: cause the inverter to generate a low power signal for the transfer of the wireless power for the PRx controller at the UOP or SCOP in response to receiving the zero power request, where the primary coil is configured to transmit the low power signal in association with the transfer of the wireless power for the PRx controller.

Clause 43. A power transmitter (PTx) of a wireless power transfer (WPT) system, the PTx including: an inverter configured to generate a wireless power signal; a primary coil operatively coupled to the inverter and configured to transmit the wireless power signal in association with a transfer of wireless power to a power receiver (PRx) during at least part of a power transfer phase of operation; a wireless communication interface configured to receive a power request from the PRx; and a PTx controller configured to: cause the wireless communication interface to communicate with the PRx to enter the power transfer phase, cause the inverter to generate the wireless power signal for the transfer of the wireless power for a load of the PRx in the power transfer phase when the power request is a non-zero power request, and cause the inverter to pause generation of the wireless power signal for the transfer of the wireless power for the load in the power transfer phase when the power request is a zero power request.

Clause 44. The PTx of clause 43, where the load of the PRx is associated with a series of on-cycles and off-cycles, where the wireless communication interface is configured to receive a corresponding series of non-zero power requests and zero power requests associated with the on-cycles and off-cycles, respectively, and where the PTx controller is configured to control the inverter based, at least in part, on the series of non-zero power requests and zero power requests.

Clause 45. The PTx of any one of clauses 43-44, where the PTx controller is further configured to cause the wireless communication interface to transmit communication signals to a wireless communication unit of the PRx during a time period between a zero power request message and a non-zero power request message, and where the communication signals are usable by the PRx to harvest a bias power to operate a PRx controller of the PRx in the power transfer phase during the time period between the zero power request message and the non-zero power request message.

Clause 46. The PTx of any one of clauses 43-45, where the zero power request message is associated with requesting a transfer of wireless power at an uncritical operating point (UOP) or safe commutation operating point (SCOP) that is lower than required for the load but sufficient to power a PRx controller or other components of the PRx, and where the PTx controller is configured to: cause the inverter to generate a low power signal for the transfer of the wireless power for the PRx controller at the UOP or SCOP in response to receiving the zero power request, where the primary coil is configured to transmit the low power signal in association with the transfer of the wireless power for the PRx controller.

Clause 47. A method of a power receiver (PRx) in a wireless power transfer (WPT) system, the method including: determining that a power transmitter (PTx) is in a connected phase of operation with the PRx; causing, during the connected phase, a protective switch of the PRx to change from a first position to a second position, the protective switch disposed between a secondary coil of the PRx and a load associated with the PRx, where the first position is configured to normally open a circuit that includes the secondary coil before a power transfer phase of operation, where the second position is configured to close the circuit; communicating a power request to the PTx after the protective switch is changed to the second position; transitioning from the connected phase to the power transfer phase; and receiving wireless power from the PTx during at least part of the power transfer phase.

Clause 48. The method of clause 47, where communicating the power request includes modifying information in a passive tag of a wireless communication unit of the PRx to include a power on indication, and where the passive tag can be read by a wireless communication interface of the PTx.

Clause 49. The method of clause 47, where communicating the power request includes transmitting, via a wireless communication unit of the PRx, the power request in a control message to the PTx.

Clause 50. The method of clause 49, further including, during the connected phase: transmitting a phase transition request message associated with requesting the PTx to transition to the power transfer phase; receiving an acknowledgement message from the PTx in response to the phase transition request message; and transmitting the power request in the control message after receiving the acknowledgement message.

Clause 51. The method of clause 50, further including: detecting whether an activation switch associated with the load has been turned on; and refraining from transmitting the phase transition request message until after the activation switch has been turned on.

Clause 52. The method of any one of clauses 50-51, where the phase transition request message, the acknowledgement message, and the control message are associated with a WPT specification that defines when the protective switch is changed from the first position to the second position such that the protective switch is changed to the second position before the control message.

Clause 53. The method of clause 52, where the WPT specification defines: a first maximum time allowed between the phase transition request message and the acknowledgement message, and a second maximum time allowed between the acknowledgement message and the control message.

Clause 54. The method of any one of clauses 47-53, further including: determining that an activation switch associated with the load has been turned on; and causing, via a communication with the PTx, the PTx to transition to the power transfer phase after the activation switch has been turned on and the protective switch is in the second position.

Clause 55. The method of any one of clauses 47-54, further including: harvesting a bias power from communication signals received by a communication coil associated with a wireless communication unit of the PRx using an energy harvester that is integrated with or operatively coupled to the wireless communication unit; and powering a PRx controller of the PRX using the bias power at least during the connected phase.

Clause 56. The method of clause 55, further including: powering the PRx controller using the bias power during the connected phase; and power the PRx controller during at least a portion of the power transfer phase using the wireless power.

Clause 57. The method of any one of clauses 55-56, where causing the protective switch of the PRx to change from the first position to the second position includes: using the bias power to at least initially generate a switch signal to control the protective switch.

Clause 58. The method of any one of clauses 47-57, further including: detecting a condition associated with ending operation of the load, where the condition includes a load switch disconnecting the load or an activation switch being turned off; causing the PTx and the PRx to transition from the power transfer phase to the connected phase based on the condition; and causing the protective switch to change to the first position in association with a transition from the power transfer phase to the connected phase.

Clause 59. The method of clause 58, further including: determining to transition from the power transfer phase to the connected phase; modifying information in a passive tag of a wireless communication unit of the PRx to indicate a zero power or power off request to cause the PTx to transition to the connected phase, where the passive tag can be read by a wireless communication interface of the PTx;

and causing the protective switch to change to the first position after modifying the information in the passive tag.

Clause 60. The method of clause 58, determining to transition from the power transfer phase to the connected phase; transmitting a second phase transition request message associated with requesting the PTx to transition to the connected phase; receiving a second acknowledgement message from the PTx in response to the second phase transition request message, the second acknowledgement message indicative that the PTx has or will transition to the connected phase; and causing the protective switch to change to the first position after receiving the second acknowledgement message.

Clause 61. The method of any one of clauses 47-60, further including: communicating a zero power request message associated with pausing a transfer of wireless power for the load while remaining in the power transfer phase; and subsequently communicating a non-zero power request message associated with resuming the transfer of wireless power for the load after a time period.

Clause 62. The method of clause 61, further including: harvesting a bias power from communication signals received by a communication coil associated with a wireless communication unit of the PRx in the power transfer phase during a time period between the zero power request message and the non-zero power request message.

Clause 63. A method of a power receiver (PRx) in a wireless power transfer (WPT) system, the method including: coupling a secondary coil of the PRx to a load associated with an on-cycle and an off-cycle, the secondary coil configured to receive wireless power from a power transmitter (PTx) during at least part of a power transfer phase of operation; communicating with the PTx to enter a power transfer phase in which the PTx can transfer wireless power to the PRx; communicating a non-zero power request to the PTX in association with the on-cycle of the load, the non-zero power request associated with causing the PTx to transfer the wireless power; and communicating a zero power request message to the PTX in association with the off-cycle of the load, the zero power request associated with causing the PTx to pause the transfer of the wireless power while remaining in the power transfer phase.

Clause 64. The method of clause 63, where the load is associated with a series of on-cycles and off-cycles, the method further including: controlling the transfer of the wireless power using non-zero power requests and zero power requests associated with the on-cycles and off-cycles, respectively.

Clause 65. The method of any one of clauses 63-64, further including: harvesting a bias power from communication signals received by a communication coil associated with a wireless communication unit of the PRx in the power transfer phase during a time period associated with the off-cycle.

Clause 66. The method of any one of clauses 63-65, where the zero power request message is associated with requesting the transfer of wireless power at an uncritical operating point (UOP) or safe commutation operating point (SCOP) that is lower than required by the load but sufficient to power a PRx controller or other components of the PRx.

Clause 67. A method of a power transmitter (PTx) in a wireless power transfer (WPT) system, the method including: determining that a power receiver (PRx) is in a connected phase of operation with the PTx based, at least in part, on a communication with the PRx; receiving a power request from the PRx, the power request associated with requesting a transfer of wireless power from the PTx to the PRx, where the power request represents an indication that the PRx has changed a protective switch to close a circuit that includes a secondary coil of the PRx; causing an inverter to generate a wireless power signal for the transfer of the wireless power in response to the power request; transitioning from the connected phase to a power transfer phase of operation; and transmitting the wireless power signal to transfer of the wireless power to the secondary coil of the PRx.

Clause 68. The method of clause 67, where a WPT specification defines timing for the PRx to couple the secondary coil to the load during the connected phase and before the power request for wireless power such that the power request implicitly indicates that the PRx has coupled the secondary coil to the load in accordance with the WPT specification.

Clause 69. The method of any one of clauses 67-68, where the protective switch is disposed between the secondary coil and the load of the PRx, and where the protective switch is normally in a first position configured to open the circuit that includes the secondary coil, the method further including: determining that the PRx has caused the protective switch to change to a second position based, at least in part, on the power request for the wireless power, where the second position of the protective switch is configured to close the circuit that includes the secondary coil.

Clause 70. The method of any one of clauses 67-69, further including: performing a foreign object detection (FOD) assessment during the connected phase before causing the inverter to generate the wireless power signal.

Clause 71. The method of any one of clauses 67-70, where receiving the power request includes: reading information in a passive tag of a wireless communication unit of the PRx; and receiving the power request via a power on indication in the information.

Clause 72. The method of any one of clauses 67-69, where receiving the power request includes: receiving the power request via a control message in a transmission from a wireless communication unit of the PRx.

Clause 73. The method of clause 72, further including: receiving a phase transition request message from the PRX, the phase transition request message associated with requesting the PTx to transition to the power transfer phase, transmitting an acknowledgement message to the PRx in response to the phase transition request message, and receiving the control message after transmitting the acknowledgement message.

Clause 74. The method of clause 73, further including performing an FOD assessment after the phase transition request message and before the acknowledgement message.

Clause 75. The method of any one of clauses 73-74, where the phase transition request message, the acknowledgement message, and the control message are associated with a WPT specification that defines timing for when the PRx closes the circuit that includes the secondary coil such that the circuit is closed before the control message.

Clause 76. The method of clause 75, where the WPT specification defines: a first maximum time allowed between the phase transition request message and the acknowledgement message, and a second maximum time allowed between the acknowledgement message and the control message.

Clause 77. The method of any one of clauses 75-76, where the WPT specification requires the PRx to couple the secondary coil to the load via the protective switch before the power request.

Clause 78. The method of any one of clauses 67-77, further including: transmitting communication signals from a wireless communication interface of the PTx to the wireless communication unit of the PRx at least during the connected phase, where the communication signals are usable by the PRx to harvest a bias power to operate a PRx controller of the PRx.

Clause 79. The method of any one of clauses 67-78, further including: receiving a zero power or power off request from information in a passive tag of the wireless communication unit of the PRx; causing the inverter to cease generating the wireless power signal in response to the zero power or power off request; and transitioning to the connected phase.

Clause 80. The method of clause 79, further including: transmitting communication signals from a wireless communication interface of the PTx to the wireless communication unit of the PRx after causing the inverter to cease generating the wireless power signal, where the communication signals are usable by the PRx to harvest a bias power to operate a PRx controller of the PRx.

Clause 81. The method of any one of clauses 67-78, further including: receiving a second phase transition request message associated with requesting the PTx to transition to the connected phase; causing the inverter to cease generating the wireless power signal; transitioning to the connected phase; and transmitting a second acknowledgement message to the PRx in response to the second phase transition request message, the second acknowledgement message indicative that the PTx has or will transition to the connected phase.

Clause 82. The method of any one of clauses 67-81, further including, during the power transfer phase: receiving a zero power request message associated with pausing the transfer of wireless power for the load while remaining in the power transfer phase; causing the inverter to cease generating the wireless power signal for the transfer of the wireless power for the load in response to receiving the zero power; and remaining in the power transfer phase.

Clause 83. The method of clause 82, further including: subsequently receiving a non-zero power request message associated with resuming the transfer of the wireless power for the load; and causing the inverter to resume generating the wireless power signal for the transfer of the wireless power for the load in response to receiving the non-zero power request.

Clause 84. The method of clause 83, further including: causing a wireless communication interface of the PTx to transmit communication signals to a wireless communication unit of the PRx after causing the inverter to cease generating the wireless power signal, where the communication signals are usable by the PRx to harvest a bias power to operate a PRx controller of the PRx in the power transfer phase during a time period between the zero power request message and the non-zero power request message.

Clause 85. The method of any one of clauses 82-83, where the zero power request message is associated with requesting a transfer of wireless power at an uncritical operating point (UOP) or safe commutation operating point (SCOP) that is lower than required for the load but sufficient to power a PRx controller or other components of the PRx the method further including: causing the inverter to generate a low power signal for the transfer of the wireless power for the PRx controller at the UOP or SCOP in response to receiving the zero power request, where the primary coil is configured to transmit the low power signal in association with the transfer of the wireless power for the PRx controller.

Clause 86. A method of a power transmitter (PTx) in a wireless power transfer (WPT) system, the method including: communicating with a power receiver (PRx) to enter a power transfer phase of operation; receiving a power request from the PRx, the power request for controlling a transfer of wireless power for a load of the PRx during at least part of the power transfer phase; causing an inverter of the PTx to generate a wireless power signal for the transfer of the wireless power for the load in the power transfer phase when the power request is a non-zero power request; and causing the inverter to pause generation of the wireless power signal for the load while remaining in the power transfer phase when the power request is a zero power request.

Clause 87. The method of clause 86, where the load of the PRx is associated with a series of on-cycles and off-cycles, the method further including: receiving a series of non-zero power requests and zero power requests associated with the series of on-cycles and off-cycles, respectively; and controlling the inverter based, at least in part, on the series of non-zero power requests and zero power requests.

Clause 88. The method of any one of clauses 86-87, further including: causing a wireless communication interface of the PTx to transmit communication signals to a wireless communication unit of the PRx during a time period between a zero power request message and a non-zero power request message, where the communication signals are usable by the PRx to harvest a bias power to operate a PRx controller of the PRx in the power transfer phase during the time period between the zero power request message and the non-zero power request message.

Clause 89. The method of any one of clauses 86-88, where the zero power request message is associated with requesting a transfer of wireless power at an uncritical operating point (UOP) or safe commutation operating point (SCOP) that is lower than required for the load but sufficient to power a PRx controller or other components of the PRx, the method further including: causing the inverter to generate a low power signal for the transfer of the wireless power for the PRx controller at the UOP or SCOP in response to receiving the zero power request; and transmitting the low power signal in association with the transfer of the wireless power for the PRx controller.

The figures, operations, and components described herein are examples meant to aid in understanding example implementations and should not be used to limit the potential implementations or limit the scope of the claims. Some implementations may perform additional operations, fewer operations, operations in parallel or in a different order, and some operations differently.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The hardware and data processing apparatus used to implement the various illustrative components, logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, or any conventional processor, controller, microcontroller, or state machine. A processor also may be implemented as a combination of computing devices, for example, a combination of a DSP and a microprocessor, multiple microprocessors, one or more microprocessors in conjunction with a DSP core, or any other such configuration. In some implementations, particular processes, operations and methods may be performed by circuitry that is specific to a given function.

As described above, in some aspects of the subject matter described in this specification can be implemented as software. For example, various functions of components disclosed herein, or various blocks or steps of a method, operation, process or algorithm disclosed herein can be implemented as one or more modules of one or more computer programs. Such computer programs can include non-transitory processor-executable or computer-executable instructions encoded on one or more tangible processor-readable or computer-readable storage media for execution by, or to control the operation of, a data processing apparatus including the components of the devices described herein. By way of example, and not limitation, such storage media may include RAM, ROM, EEPROM, CD-ROM or other optical disk storage, magnetic disk storage or other magnetic storage devices, or any other medium that may be used to store program code in the form of instructions or data structures. Combinations of the above should also be included within the scope of storage media.

Various modifications to the implementations described in this disclosure may be readily apparent to persons having ordinary skill in the art, and the generic principles defined herein may be applied to other implementations without departing from the scope of this disclosure. Thus, the claims are not intended to be limited to the implementations shown herein but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A power receiver (PRx) of a wireless power transfer (WPT) system, the PRx comprising:
a secondary coil configured to receive wireless power from a power transmitter (PTx) during at least part of a power transfer phase of operation;
a protective switch disposed between the secondary coil and a load associated with the PRx, wherein the protective switch is normally in a first position configured to open a circuit that includes the secondary coil before the power transfer phase;
a wireless communication unit;
an energy harvester that is integrated with or operatively coupled to the wireless communication unit, the energy harvester configured to:
harvest a bias power from communication signals received by a communication coil associated with the wireless communication unit, and
provide the bias power to a PRx controller at least during a connected phase to power the PRx controller; and
the PRx controller configured to:
determine that the PTx is in the connected phase of operation with the PRx,
generate, during the connected phase, a switch signal configured to cause the protective switch to change to a second position, wherein the second position is configured to close the circuit that includes the secondary coil,
cause the wireless communication unit to communicate a power request for the PTx to transmit the wireless power after the protective switch is changed to the second position; and
transition from the connected phase to the power transfer phase.

2. The PRx of claim 1, wherein the protective switch being in the second position enables the secondary coil to receive the wireless power and provide the wireless power to the load during the power transfer phase.

3. The PRx of claim 1, wherein the PRx controller is further configured to, during the connected phase:
cause the wireless communication unit to transmit a phase transition request message associated with requesting the PTx to transition to the power transfer phase,
receive, via the wireless communication unit, an acknowledgement message from the PTx in response to the phase transition request message, and cause the wireless communication unit to transmit the power request in a control message after receiving the acknowledgement message.

4. The PRx of claim 3, wherein the PRx controller is further configured to:

detect whether an activation switch associated with the load has been turned on, and refrain from causing the wireless communication unit to transmit the phase transition request message until after the activation switch has been turned on.

5. The PRx of claim 1 wherein the PRx controller is further configured to:

determine that an activation switch associated with the load has been turned on, and cause the PTx to transition to the power transfer phase after the activation switch has been turned on and the protective switch is in the second position.

6. The PRx of claim 1, wherein the PRx controller is powered by the bias power during the connected phase and is at least partially powered by the wireless power during the power transfer phase, and wherein the switch signal is at least initially generated using the bias power.

7. The PRx of claim 1, wherein the PRx controller is further configured to:

detect a condition associated with ending operation of the load, wherein the condition includes a load switch disconnecting the load or an activation switch being turned off, cause the PTx and the PRx to transition from the power transfer phase to the connected phase based on the condition, and cause the protective switch to change to the first position in association with a transition from the power transfer phase to the connected phase.

8. The PRx of claim 7, wherein the wireless communication unit is configured to communicate with the PTx by transmitting information to a wireless communication unit of the PTx; and wherein the PRx controller is configured to:

cause the wireless communication unit to transmit a second phase transition request message associated with requesting the PTx to transition to the connected phase, receive, via the wireless communication unit, a second acknowledgement message from the PTx in response to the second phase transition request message, the second acknowledgement message indicative that the PTx has or will transition to the connected phase, and cause the protective switch to change to the first position after receiving the second acknowledgement message.

9. A method of a power receiver (PRx) in a wireless power transfer (WPT) system, the method comprising:

determining that a power transmitter (PTx) is in a connected phase of operation with the PRx;

causing, during the connected phase, a protective switch of the PRx to change from a first position to a second position, the protective switch disposed between a secondary coil of the PRx and a load associated with the PRx, wherein the first position is configured to normally open a circuit that includes the secondary coil before a power transfer phase of operation, wherein the second position is configured to close the circuit;

communicating a power request to the PTx after the protective switch is changed to the second position;

transitioning from the connected phase to the power transfer phase;

receiving wireless power from the PTx during at least part of the power transfer phase;

harvesting a bias power from communication signals received by a communication coil associated with a wireless communication unit of the PRx using an energy harvester that is integrated with or operatively coupled to the wireless communication unit; and powering a PRx controller of the PRX using the bias power at least during the connected phase.

10. The method of claim 9, wherein communicating the power request includes transmitting, via a wireless communication unit of the PRx, the power request in a control message to the PTx.

11. The method of claim 10, further comprising, during the connected phase:

transmitting a phase transition request message associated with requesting the PTx to transition to the power transfer phase;

receiving an acknowledgement message from the PTx in response to the phase transition request message; and transmitting the power request in the control message after receiving the acknowledgement message.

12. The method of claim 11, wherein the phase transition request message, the acknowledgement message, and the control message are associated with a WPT specification that defines when the protective switch is changed from the first position to the second position such that the protective switch is changed to the second position before the control message.

13. The method of claim 9, further comprising:

determining that an activation switch associated with a load has been turned on; and causing, via a communication with the PTx, the PTx to transition to the power transfer phase after the activation switch has been turned on and the protective switch is in the second position.

14. The method of claim 9, wherein causing the protective switch of the PRx to change from the first position to the second position includes:

using the bias power to at least initially generate a switch signal to control the protective switch.

15. The method of claim 9, further comprising:

detecting a condition associated with ending operation of the load, wherein the condition includes a load switch disconnecting the load or an activation switch being turned off, causing the PTx and the PRx to transition from the power transfer phase to the connected phase based on the condition; and causing the protective switch to change to the first position in association with a transition from the power transfer phase to the connected phase.

16. The method of claim 15, determining to transition from the power transfer phase to the connected phase;

transmitting a second phase transition request message associated with requesting the PTx to transition to the connected phase;

receiving a second acknowledgement message from the PTx in response to the second phase transition request message, the second acknowledgement message indicative that the PTx has or will transition to the connected phase; and causing the protective switch to change to the first position after receiving the second acknowledgement message.

* * * * *